(12) United States Patent
Miyazaki et al.

(10) Patent No.: US 10,701,184 B2
(45) Date of Patent: Jun. 30, 2020

(54) INFORMATION PROCESSING APPARATUS, INFORMATION PROCESSING SYSTEM, AND INFORMATION PROCESSING METHOD

(71) Applicant: SONY INTERACTIVE ENTERTAINMENT INC., Tokyo (JP)

(72) Inventors: Yoshio Miyazaki, Kanagawa (JP); Atsunobu Tatsumi, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/300,275

(22) PCT Filed: May 11, 2017

(86) PCT No.: PCT/JP2017/017926
§ 371 (c)(1),
(2) Date: Nov. 9, 2018

(87) PCT Pub. No.: WO2017/199859
PCT Pub. Date: Nov. 23, 2017

(65) Prior Publication Data
US 2019/0149636 A1 May 16, 2019

(30) Foreign Application Priority Data
May 18, 2016 (JP) .................. 2016-099908

(51) Int. Cl.
*H04L 29/08* (2006.01)
*H04N 5/232* (2006.01)
(Continued)

(52) U.S. Cl.
CPC .......... *H04L 67/36* (2013.01); *G06K 9/00671* (2013.01); *G06T 11/60* (2013.01);
(Continued)

(58) Field of Classification Search
CPC ......... H04L 67/36; H04L 29/08; H04L 67/38; G06K 9/00671; G06T 11/60;
(Continued)

(56) References Cited

U.S. PATENT DOCUMENTS

2011/0225479 A1* 9/2011 Hassan ............. H03M 13/3738
714/807
2013/0271668 A1* 10/2013 Argyropoulos ...... H04N 17/004
348/720
(Continued)

FOREIGN PATENT DOCUMENTS

EP          0999518       5/2000
JP          11-150729 A   6/1999
(Continued)

OTHER PUBLICATIONS

International Search Report and Written Opinion completed Aug. 4, 2017, from International Application No. PCT/JP2017/17926, 7 sheets.
(Continued)

*Primary Examiner* — Lixi C Simpson
(74) *Attorney, Agent, or Firm* — Katten Muchin Rosenman LLP

(57) ABSTRACT

In an information processing apparatus 200, a communication portion 250 acquires a data stream of a photographed image in a wireless communication manner. A packet analyzing portion 252 detects a lost packet, and a retransmission request producing portion 254 issues a retransmission request for a packet within a predetermined allowable time. Along with expiration of the allowable time, a lacked information producing portion 258 produces lacked information in which data lacked due to the packet loss is associated with a position on an image plane. A decoding portion 260 decodes the data associated with the photographed image and stored in the buffer 256, and substitutes
(Continued)

invalid data for the lacked portion. An image analyzing portion 262 differentiates the lacked portion from other portions, and performs analysis processing. An information processing portion 264 and an output data producing portion 266 execute information processing by utilizing the analysis result, and produce output data, respectively.

7 Claims, 15 Drawing Sheets

(51) Int. Cl.

| | | |
|---|---|---|
| *H04N 13/00* | (2018.01) | |
| *H04N 19/00* | (2014.01) | |
| *G06K 9/00* | (2006.01) | |
| *G06T 11/60* | (2006.01) | |
| *H04L 29/06* | (2006.01) | |
| *H04N 7/18* | (2006.01) | |

(52) U.S. Cl.
CPC ............. *H04L 29/08* (2013.01); *H04L 67/38* (2013.01); *H04N 5/23229* (2013.01); *H04N 7/183* (2013.01); *H04N 13/00* (2013.01); *H04N 19/00* (2013.01); *H04N 5/23293* (2013.01)

(58) Field of Classification Search
CPC .... H04N 5/23229; H04N 7/183; H04N 13/00; H04N 19/00; H04N 5/23293
See application file for complete search history.

(56) References Cited

U.S. PATENT DOCUMENTS

| | | | |
|---|---|---|---|
| 2014/0184475 A1* | 7/2014 | Tantos | H04N 21/2383 |
| | | | 345/8 |
| 2015/0244761 A1* | 8/2015 | Tsyganok | G06F 11/08 |
| | | | 709/219 |
| 2016/0323062 A1* | 11/2016 | Yang | H03M 13/154 |

FOREIGN PATENT DOCUMENTS

| | | |
|---|---|---|
| JP | 2007-281692 A | 10/2007 |
| JP | 2015-144474 A | 8/2015 |

OTHER PUBLICATIONS

International Preliminary Report on Patentability dated Nov. 20, 2018, from International Application No. PCT/JP2017/17926, 14 sheets.

* cited by examiner

F I G. 1
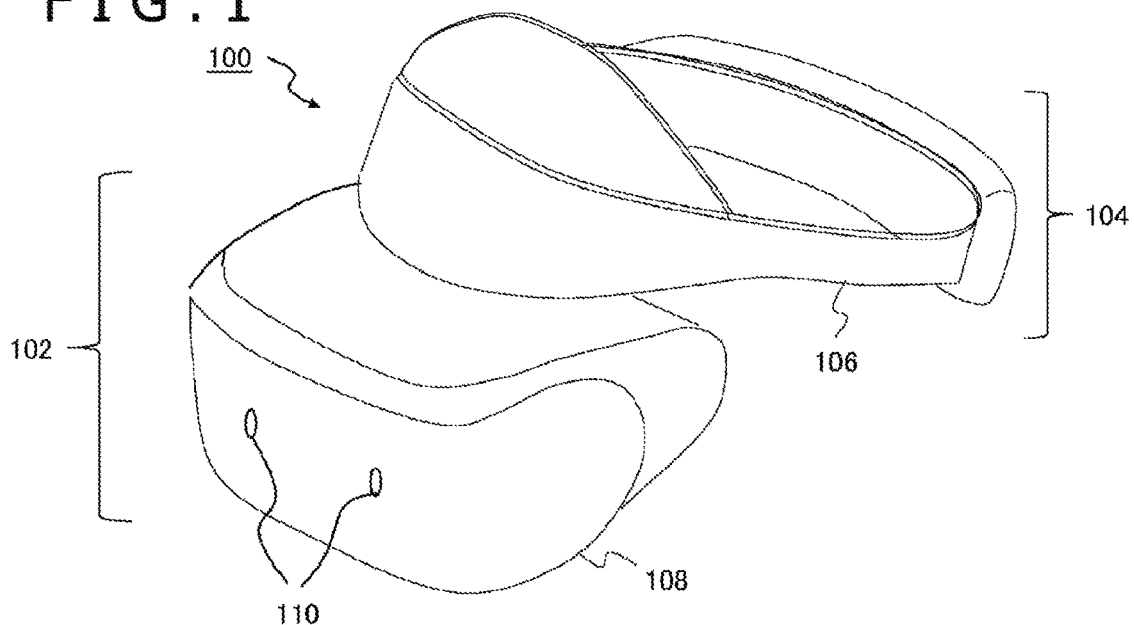
F I G. 2
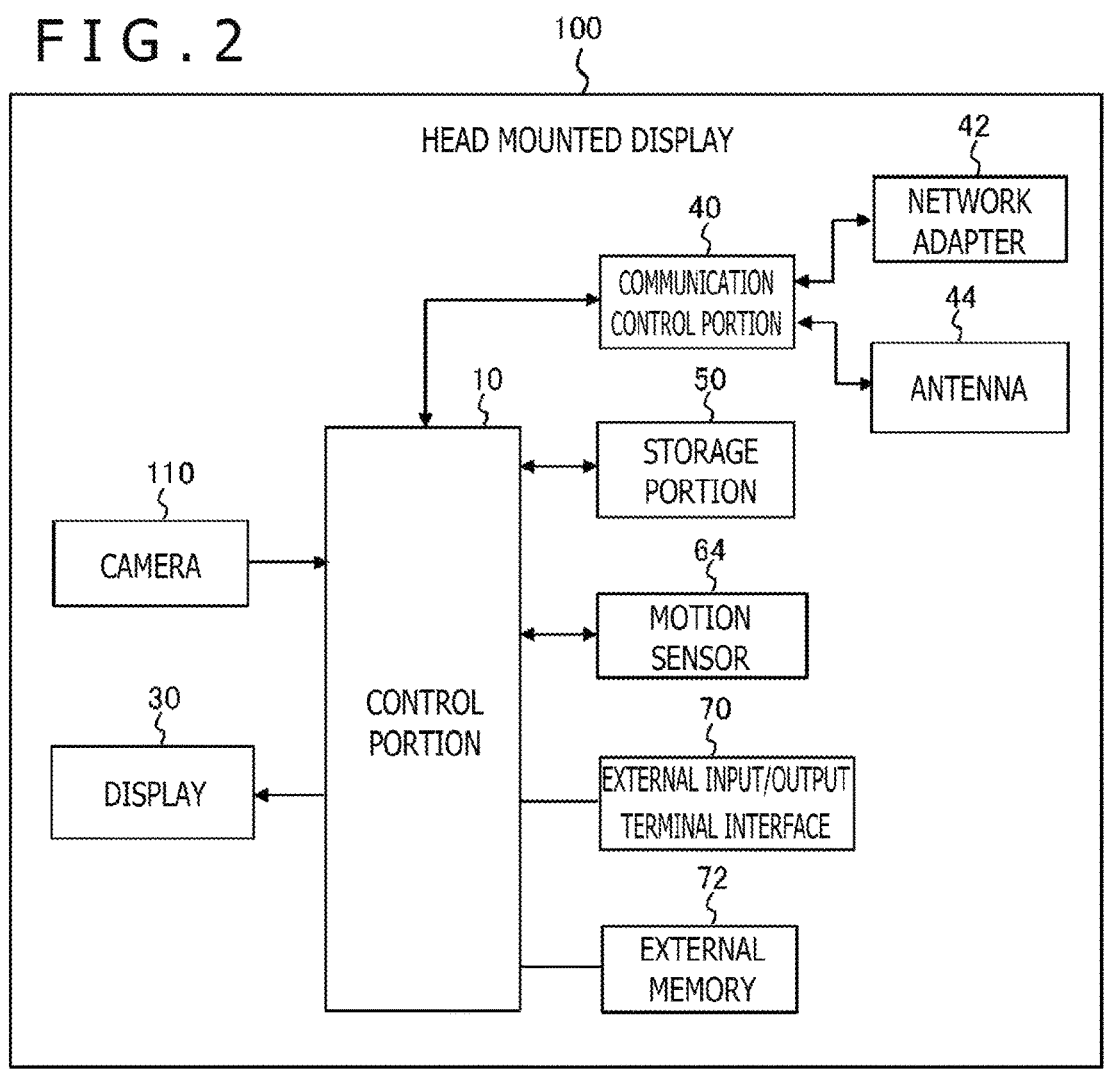

| NUMBER OF ROWS | NUMBER OF COLUMNS | TOTAL DATA LENGTH (byte) |
|---|---|---|
| 6 | 8 | 1M |

| ROW | COLUMN | DATA LENGTH (byte) | FALLING RATE(%) |
|---|---|---|---|
| 0 | 0 | 20000 | 10 |
| 0 | 1 | 30000 | 20 |
| 0 | 2 | 15000 | 0 |
| 0 | 3 | 20000 | 0 |

F I G. 1 2

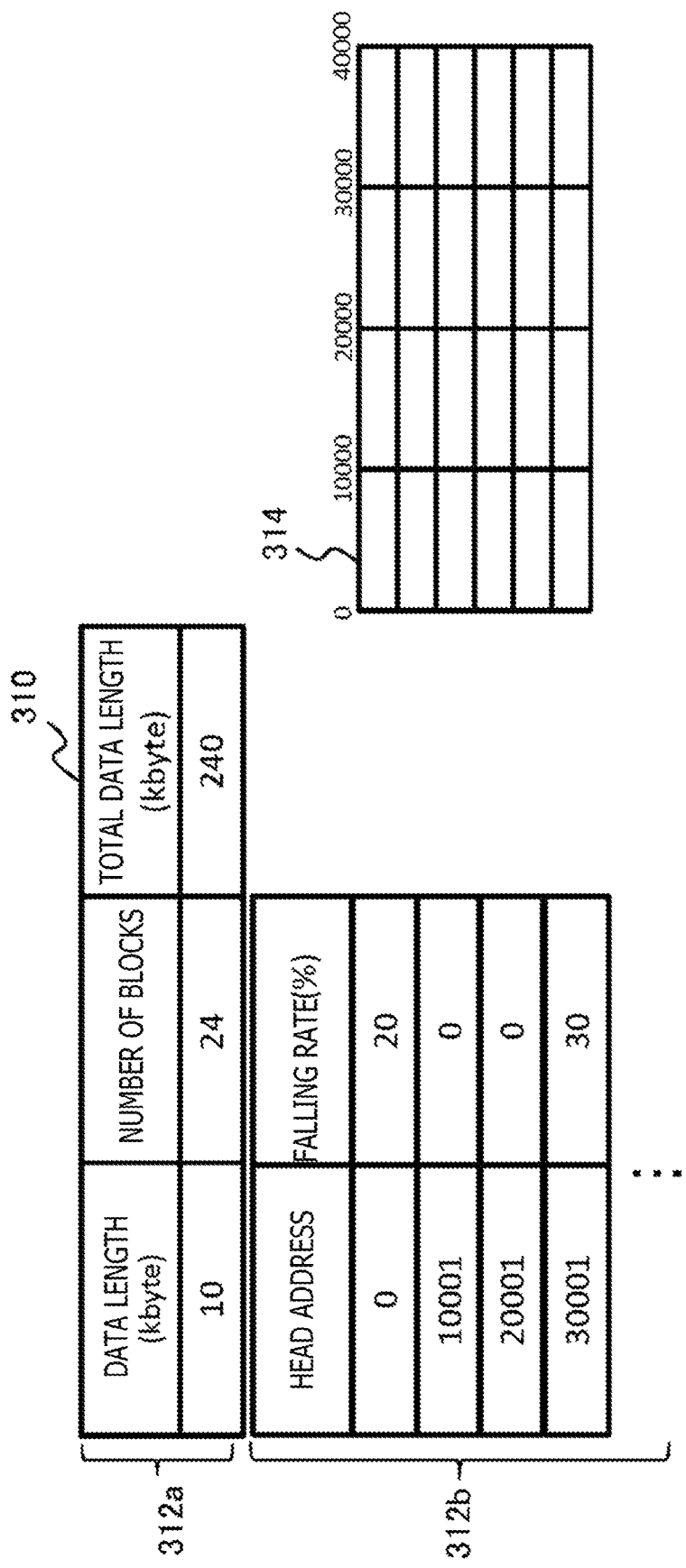
F I G. 13

INFORMATION PROCESSING APPARATUS, INFORMATION PROCESSING SYSTEM, AND INFORMATION PROCESSING METHOD

TECHNICAL FIELD

The present invention relates to an information processing apparatus and an information processing system each of which executes information processing by utilizing a photographed image, and an information processing method carried out in those.

BACKGROUND ART

There is known a game in which a user is photographed with a video camera, and the resulting image is replaced with another image to be displayed on a display (for example, refer to PTL 1). In addition, there is also known a user interface system in which a motion of a mouth or a hand photographed with a video camera is received as a manipulation instruction of an application. In such a way, the technique with which a real world is photographed and a virtual world responding to a motion of the real world is displayed, or some sort of information processing is executed is utilized in a wide range of fields from a small portable terminal up to a leisure facility irrespective of the scale thereof.

A system with which a panorama image is displayed on a head mounted display, and when a user wearing the head mounted display rotates his/her head, the panorama image responding to a gaze direction is displayed is also developed as an example thereof. The head mounted display is utilized, resulting in that a sense of immersion in the image can be increased, or the operationability of an application such as a game can be enhanced. In addition, a walk through system with which the user wearing the head mounted display physically moves, resulting in that the user can virtually walk around within the space displayed as the image is also developed.

CITATION LIST

Patent Literature

[PTL 1]
EP 0999518 A1

SUMMARY

Technical Problems

For realizing the picture expression having the presence, or executing the information processing with high accuracy, it is desirable to increase the resolution or the frame rate of the photographed image. On the other hand, if the number of data sizes which should be handled in such a manner is increased, then, a load applied to data transmission or image analysis is increased, and a period of time required until the image display is increased. As a result, there is caused the shift between the actual motion and the display, and so forth, and thus the user may be given a sense of discomfort in some cases. In addition, the transmission band is oppressed, resulting in that a lack of the data becomes easy to occur, and the accuracy of the image analysis may become rather worse in some cases.

The present invention has been made in the light of such problems, and it is therefore an object of the present invention to provide a technique with which a satisfactory processing result can be acquired without injuring currency in information processing followed by transmission and an analysis of data associated with a photographed image.

Solution to Problems

In order to solve the problems described above, a certain aspect of the present invention relates to an information processing apparatus. The information processing apparatus is characterized by including a communication portion, a lacked information producing portion, an image analyzing portion, and an output data producing portion. In this case, the communication portion serves to establish a communication with an image pickup device and acquire data associated with a photographed image. The lacked information producing portion serves to produce lacked information with which data lacked as a result of the communication, and a position on the photographed image are associated with each other. The image analyzing portion serves to differentiate a portion in which the data is lacked from other portions by referring to the lacked information, and analyze the photographed image. The data producing portion serves to produce output data based on an analysis result and output the output data.

Another aspect of the present invention relates to an information processing system. The information processing system is characterized by including a head mounted display provided with an image pickup device, and an information processing apparatus configured to establish a communication with the head mounted display, produce a display image and cause the head mounted display to display the display image. The information processing apparatus is provided with a communication portion, a lacked information producing portion, an image analyzing portion, and an output data producing portion. In this case, the communication portion serves to acquire data associated with a photographed image from the head mounted display. The lacked information producing portion serves to produce lacked information with which data lacked as a result of the communication, and a position on the photographed image are associated with each other. The image analyzing portion serves to differentiate a portion in which data is lacked from other portions by referring to the lacked information, and analyze the photographed image. The output data producing portion serves to produce output data based on an analysis result and output the output data.

Still another aspect of the present invention relates to an information processing method. The information processing method is characterized by including, by an information processing apparatus, a step of establishing a communication with an image pickup device and acquiring data associated with a photographed image, a step of producing lacked information in which data lacked as a result of the communication is associated with a position on the photographed image, a step of differentiating a portion in which the data is lacked from other portions by referring to the lacked information, thereby carrying out an analysis of the photographed image, and a step of producing output data based on a result of the analysis and outputting the output data to a display device.

It should be noted that an arbitrary combination of constituent elements described above, and results obtained by converting an expression of the present invention among a method, an apparatus, a system, a computer program, a data structure, a recording medium, and the like are valid in terms of aspects of the present invention.

Advantageous Effect of Invention

According to the present invention, in the information processing followed by the transmission and the analysis of the data associated with the photographed image, the satisfactory processing results can be acquired without injuring the currency.

BRIEF DESCRIPTION OF DRAWINGS

FIG. 1 is an external view of a head mounted display of an embodiment.

FIG. 2 is a block diagram depicting a circuit configuration of the head mounted display of the embodiment.

FIG. 12 is a diagram exemplifying a data structure of lacked information which the lacked information producing portion of the information processing apparatus produces in the embodiment.

FIG. 13 is a diagram exemplifying a data structure of lacked information which the lacked information producing portion of the information processing apparatus produces in the embodiment.

DESCRIPTION OF EMBODIMENT

Figure 3:
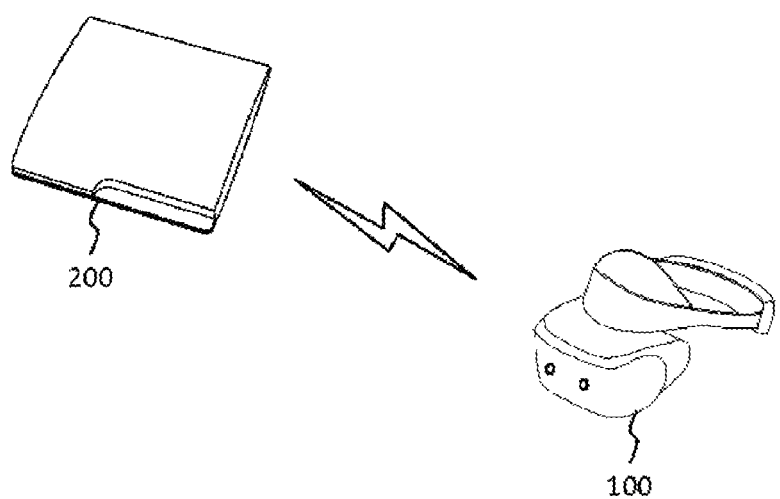
FIG. 3 is a view depicting a configuration of an information processing system of the embodiment.

In this embodiment, in a system in which information processing is executed by using an image photographed with an image pickup device, and a result of the information processing is immediately displayed, even if data is lacked at the time of transmission, the maximum performance can be exhibited. In this regard, although the form of the image pickup device or a display device is not especially limited, in this case, a description will be given by exemplifying a head mounted display provided with a camera. Drawing and displaying an image in which a field of view is changed so as to respond to a motion of a head of a user wearing the head mounted display by utilizing an image photographed by the head mounted display are a suitable example from a viewpoint of the severity of a time constraint. However, even if the image pickup device and the display device have different chassis, the embodiment can be similarly applied to this case.

FIG. 1 depicts an example of an external shape of a head mounted display in an embodiment. In this example, a head mounted display 100 includes an output mechanism portion 102 and a mounting mechanism portion 104. The mounting mechanism portion 104 includes a mounting band 106 which makes a circuit of a head of a user with the user wearing the mounting band 106 to realize the fixing of the apparatus. The mounting band 106 is made of a raw material or has a structure which can be adjusted in length in response to the circumference of the head of the user. For example, the mounting band 106 may be composed of an elastic body such as a rubber, or may utilize a buckle, a gear or the like.

The output mechanism portion 102 includes a chassis 108 having such a shape as to cover the both eyes in a state in which the user wears the head mounted display 100, and is provided with a display panel in an inside thereof in such a way that the display panel directly faces the eyes at the time of the wearing. The display panel is realized by a liquid crystal panel, an organic Electroluminescence (EL) panel, or the like. The chassis 108 is further provided with a pair of lenses in the inside thereof which are located between the display panel and the eyes of the user at the time of the wearing of the head mounted display 100, and by which an image can be visually recognized in a wide field of view. In addition, the head mounted display 100 may be further provided with speakers or earphones in positions corresponding to the ears of the user at the time of the wearing.

The head mounted display 100 is provided with a camera 110 in a front surface of the output mechanism portion 102. The camera 110 is provided with an image pickup element such as a Charge Coupled Device (CCD) or a Complementary Metal Oxide Semiconductor (CMOS), and photographs the real space at a predetermined frame rate in a field of view corresponding to a direction of a face of the user who wears the head mounted display 100. It should be noted that only one camera 110 may be provided in the front surface of the head mounted display 100, or two cameras may be provided as stereoscopic cameras which are arranged in the right and left sides so as to have a known interval. In addition, the arrangement of the cameras 110 is not especially limited.

The image photographed by the camera 110 can be used as at least a part of the display image in the head mounted display 100. In addition thereto, the image concerned can also be used for input data for the image analysis necessary for the production of the virtual world. For example, if the photographed image is made the display image as it is, then, the user undergoes the same state as that in which the user directly sees the real space right in front of his/her eyes. In addition, an object which stays on the real object such as a disk lying within the field of view or interactions with the real object is drawn on the photographed image to be made the display image, thereby enabling the Augmented Reality (AR) to be realized.

Moreover, the position and posture of the user who wears the head mounted display 100 are specified from the photographed image, and the field of view is changed so as to correspond to the position and posture of the user to draw the virtual world, thereby also enabling the Virtual Reality (VR) to be realized. The general technique such as Visual Simultaneous Localization And Mapping (v-SLAM) can be applied to the technique for estimating the position and posture of the camera from the photographed image. An angle of rotation and an inclination of the head may be measured by a motion sensor built in the head mounted display 100 or an external motion sensor. The analysis result of the photographed image, and the measured value by the motion sensor may be utilized in a mutually complementary manner.

FIG. 2 depicts a circuit configuration of the head mounted display 100. A control portion 10 is a main processor for processing signals such as an image signal and a sensor signal, or an instruction or data, thereby outputting the resulting signals, instruction or data. The camera 110 supplies the data associated with the photographed image to the control portion 10. A display 30 is composed of a liquid crystal display or the like, receives the image signal from the control portion 10, and displays an image associated with the image signal.

A communication control portion 40 transmits the data inputted thereto from the control portion 10 to the outside through a wired or wireless communication via a network adapter 42 or an antenna 44. The communication control portion 40 also receives the data from the outside through the wired or wireless communication via the network adapter 42 or the antenna 44, and outputs the data thus received to the control portion 10. A storage portion 50 temporarily stores the data, a parameter, a manipulation signal, and the like which the control portion 10 processes.

A motion sensor 64 detects posture information associated with an angle of rotation, an inclination and the like of the head mounted display 100. The motion sensor 64 is realized by suitably combining a gyro sensor, an acceleration sensor, a geomagnetic sensor, and the like with one another. An external input/output terminal interface 70 is an interface for connection of peripheral units such as a Universal Serial Bus (USB) controller. An external memory 72 is an external memory such as a flash memory. The control portion 10 can supply the image or sound data to the display 30 or a headphone (not depicted), thereby outputting the image or the sound, or can supply the image or the sound data to the communication control portion 40, thereby transmitting the image or the sound data thus supplied to the outside.

FIG. 3 is a view depicting a configuration of an information processing system according to the embodiment. The head mounted display 100 establishes a communication with an information processing apparatus 200 in accordance with a communication protocol such as a Bluetooth (registered trademark) protocol or an institute of Electrical and Electronic Engineers (IEEE) 802.11 protocol via the antenna 44 of FIG. 2. The information processing apparatus 200 may be further connected to a server through a network. In this case, the server may present an online application such as a game in which a plurality of users can participate through the network to the information processing apparatus 200. The head mounted display 100 may be connected to a computer or a portable terminal instead of being connected to the information processing apparatus 200.

The information processing apparatus 200 basically repetitively executes the processing in which after the data associated with the image photographed with the camera 110 of the head mounted display 100 is successively received to be subjected to predetermined processing, the image to be displayed is produced to be transmitted to the head mounted display 100 every frame. As a result, the various images such as AR and VR are displayed in the field of view responding to the direction of the face of the user on the head mounted display 100. It should be noted that the game, the virtual expression, the appreciation of the moving image, and the like are variously considered as the ultimate aim of such display.

Figure 4:
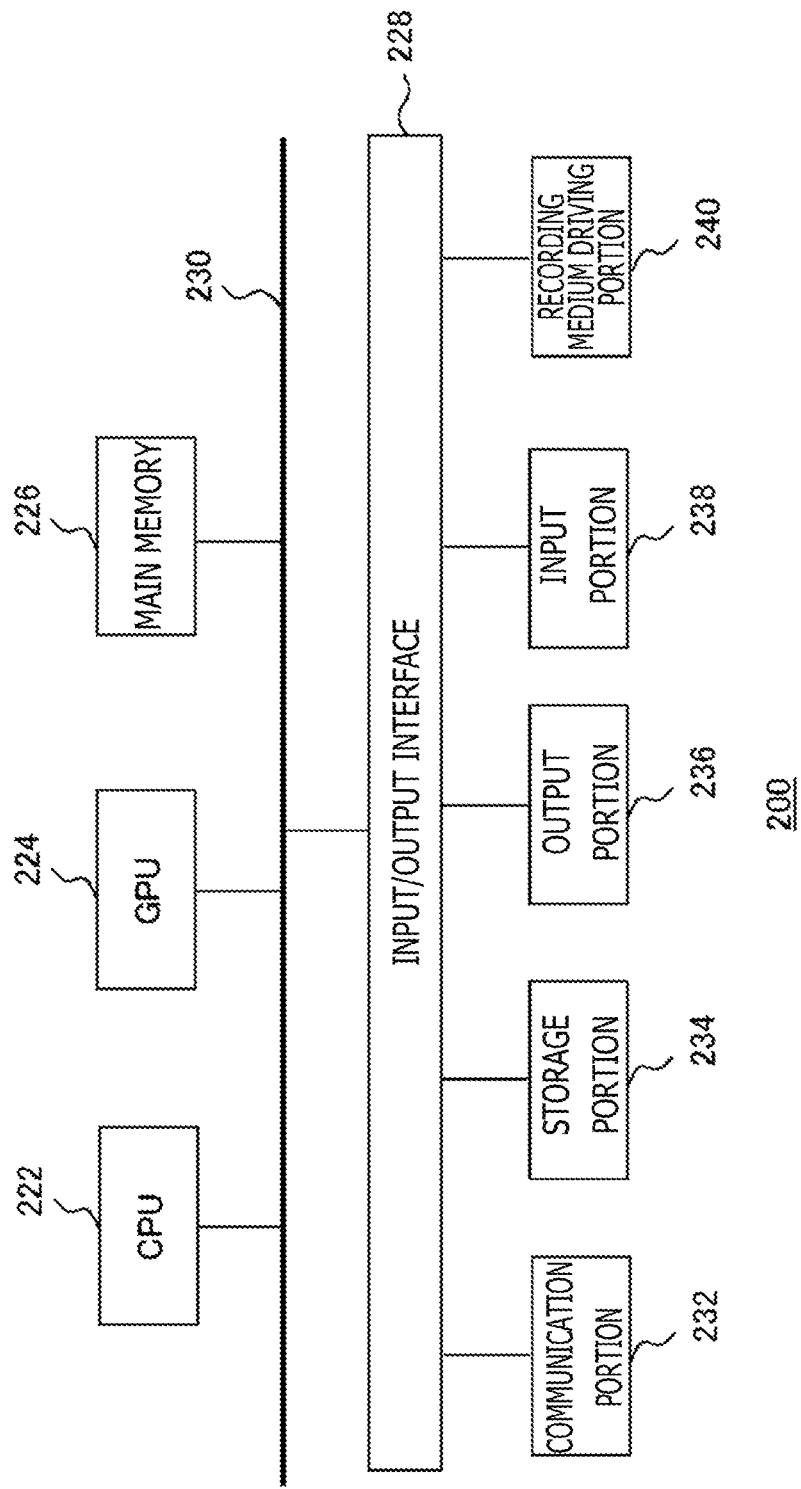
FIG. 4 is a block diagram depicting an internal circuit configuration of an information processing apparatus of the embodiment.

FIG. 4 depicts a configuration of an internal circuit of the information processing apparatus 200. The information processing apparatus 200 includes a Central Processing Unit (CPU) 222, a Graphics Processing Unit (GPU) 224, and a main memory 226. These portions are connected to one another through a bus 230. An input/output interface 228 is further connected to the bus 230.

To the input/output interface 228, a communication portion 232, a storage portion 234 such as a hard disc drive or a non-volatile memory, an outputting portion 236, an input portion 238, and a recording medium drive portion 240 are connected. In this case, the communication portion 232 is composed of a peripheral unit interface such as the USE or the IEEE1394, or a network interface such as a wired or wireless Local Area Network (LAN). The outputting portion 236 serves to output the data associated with the image or sound to a display device or a speaker (not depicted). The input Portion 238 serves to receive as an input thereof the data from an input device (not depicted). The recording medium drive portion 240 serves to drive a removable recording medium such as a magnetic disk, an optical disc or a semiconductor memory.

The CPU 222 executes an operating system stored in the storage portion 234, thereby controlling the whole of the information processing apparatus 200. The CPU 222 also executes the various kinds of programs which are read out from the removable recording medium to be loaded into the main memory 226, or are downloaded through the communication portion 232. The GPU 224 has a function of a geometry engine, and a function of a rendering processor, and executes drawing processing in accordance with a drawing instruction issued from the CPU 222. The main memory 226 is composed of a Random Access Memory (RAM), and stores therein the program and data required for the processing.

Figure 5:
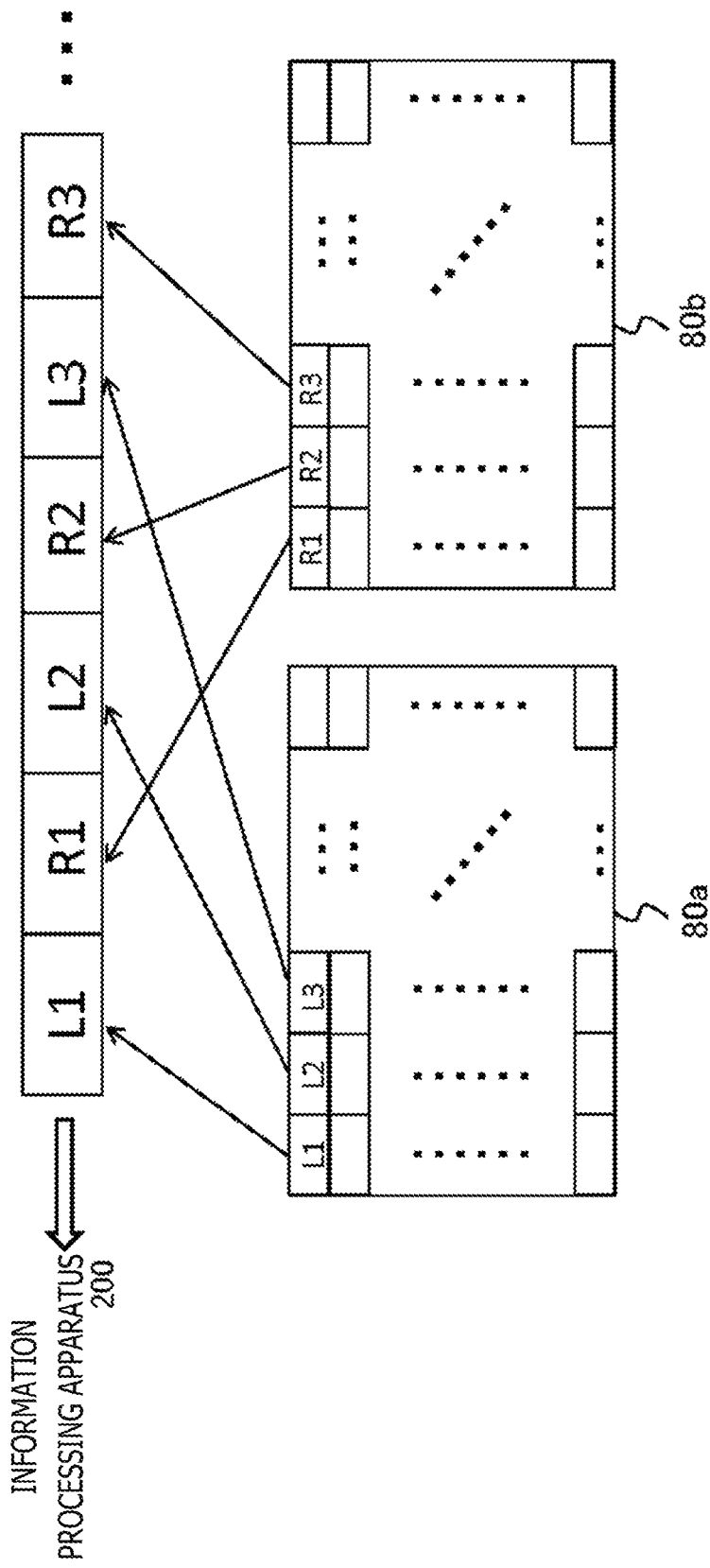
FIG. 5 is a view schematically depicting a data structure when the head mounted display in the embodiment transmits an image photographed with a camera.

FIG. 5 schematically depicts a data structure when the head mounted display 100 transmits the image photographed with the camera 110. In the case where the camera 110 is composed of a stereoscopic camera, a pair of photographed image 80*a* in the left point of view and photographed image 80*b* in the right point of view is acquired at a predetermined frame rate. The head mounted display 100 packetizes the acquired image data in order from the upper left of the image in a predetermined transmission unit so as to correspond to the order of scanning in the image pickup element, and transmits the image data thus packetized to the information processing apparatus 200.

The figure represents that the image data is packetized in the transmission unit of L1, L2, L3, ... from the upper left of the photographed image 80a in the left point of view, and R1, R2, R3, ... from the upper left of the photographed image 80b in the right point of view.

The data in the transmission units is subjected to the compression coding in a predetermined format, and the data associated with the photographed image 80a in the left point of view, and the photographed image 80b in the right point of view is alternately sent. That is, the data in the transmission unit of L1, R1, L2, R2, L3, R3, ... is transmitted as a data stream in this order.

It should be noted that the number of rows and the number of columns in the pixels constituting the transmission units are determined based on the affinity with the coding system adopted. In addition, in the illustrated example, for simplification, the area of the image in the transmission unit, and the data size of the image coded and contained in one packet are both equally expressed. However, in the case where the variable length coding system is adopted, one of them may be inequal.

Figure 6:
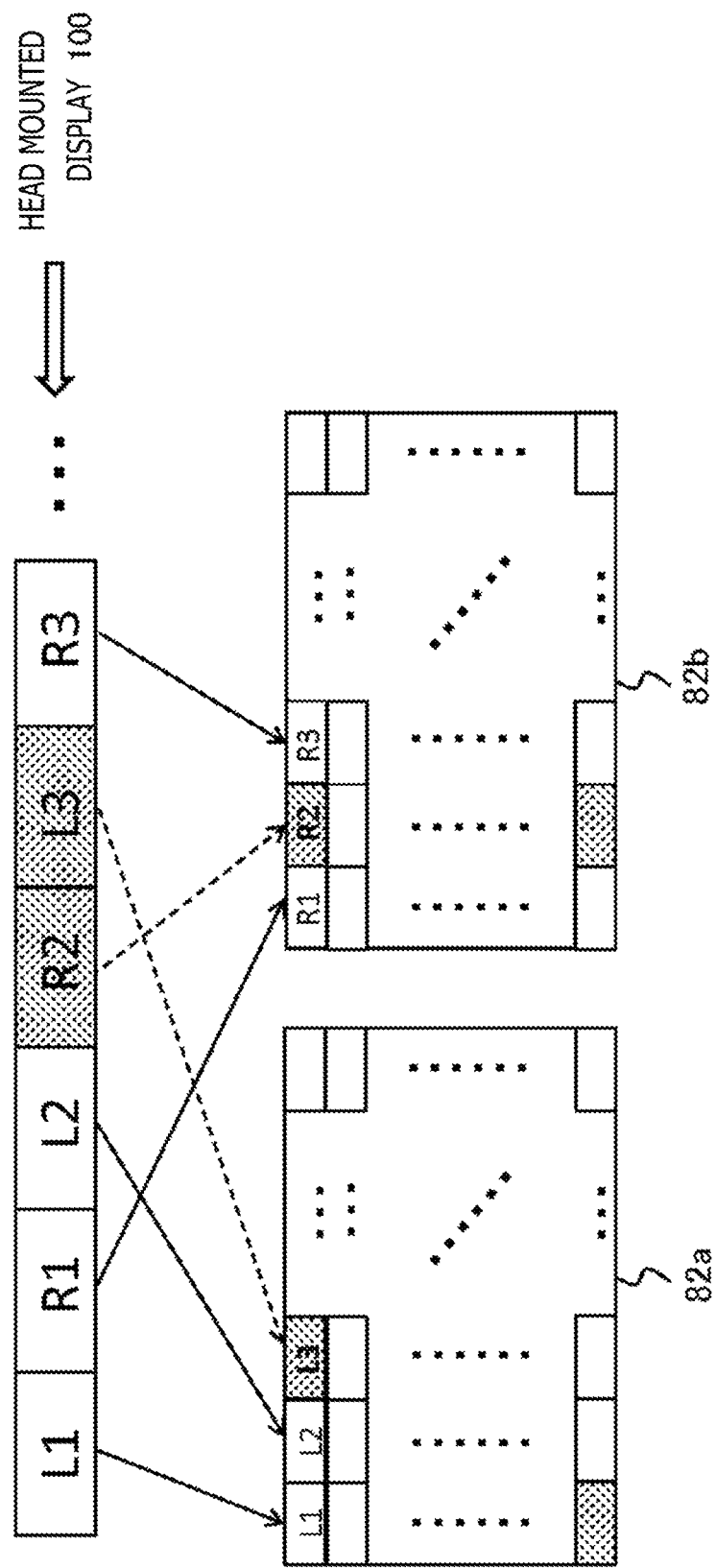
FIG. 6 is a view schematically depicting a data structure of an image which the information processing apparatus in the embodiment receives from the head mounted display.

FIG. 6 schematically depicts a data structure of the image which the information processing apparatus 200 receives from the head mounted display 100. As described in FIG. 5, the data associated with the photographed image in the left point of view, and the data associated with the photographed image in the right point of view are alternately transmitted in the predetermined transmission unit from the head mounted display 100. Therefore, properly speaking, as depicted in the upper stage of the figure, the data in the transmission unit of L1, R1, L2, R2, L3, R3, ... acquired as the data stream in this order.

The information processing apparatus 200 decodes the data which is sequentially transmitted in such a manner, and develops the decoded data in the buffer memory so as to be associated with the original positions on the image plane, thereby restoring the original photographed image, that is, the photographed image 82a in the left point of view, and the photographed image 82b in the right point of view. However, the packet is lost during the transmission due to the communication situation or the like. The figure depicts the fact that the transmission units R2 and L3 are not transmitted in the form of the hatching. At this time, the photographed images 82a and 82b restored are naturally imperfect.

As measures taken for such a case, heretofore, there has been a function of an Automatic repeat-request (ARQ) for requesting the transmission source to retransmit the lost packet. The ARQ is mounted as one of the error correction methods to the communication protocol such as a Real-time Transport Protocol (RTP) or a Transmission Control Protocol (TCP). If the retransmitted packet can be acquired by this function, then, the error correction including the loss can be reliably carried out. On the other hand, a time shall be consumed due to the transmission of the retransmission request signal and the packet retransmission of the data concerned. In addition, it is also possible that even in such a case, the retransmitted packet is lost again.

Figure 7:
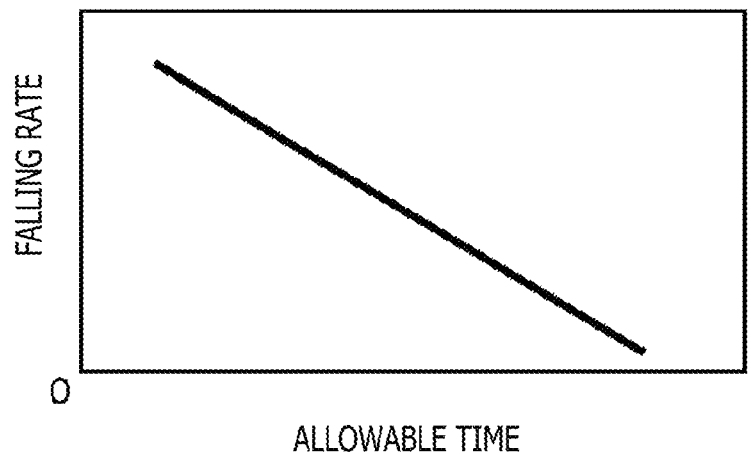
FIG. 7 is a graphical representation quantitatively depicting a falling rate of data with respect to a time allowable for retransmission processing in image data transmission of the embodiment.

FIG. 7 qualitatively depicts a falling rate of the data with respect to a time allowable for the retransmission processing when the image data is transmitted. As depicted in the figure, as the allowable time is longer, the margin occurs in the individual retransmission processing, and also the probability that it is possible to cope with a plurality of times of the packet losses in the same data is increased. As a result, the falling rate of the data is reduced. On the other hand, in the case where it is supposed that after like the embodiment, some sort of information processing is executed by using the photographed image, the image which moves so as to correspond to the actual motion is displayed, a time allowable for the data transmission is very short.

Then, even if the allowable time is limited, the image data which is transmitted for that time is utilized to the fullest, and thus the image analysis is properly carried out. Specifically, the portion in which the data is lacked on the image is signalized, resulting in that in the image analysis or the subsequent information processing, the portion concerned can be handled so as to be distinguished from other portions. In general, the processing such as ARQ pertaining to the data transmission is controlled independently of other pieces of processing by the mutual communication mechanisms. In the embodiment, the parameter pertaining to such transmission is organically coupled to the analysis function which is mounted to the application such as the game, thereby causing the balance between the currency including the data transmission, and the accuracy of the processing to be satisfactory. In addition, by utilizing such a mechanism, the allowable time can be adjusted from a viewpoint of the processing accuracy, and the algorithm of the processing can be suitably switched in response to the falling rate of the data decided by the allowable time.

Figure 8:
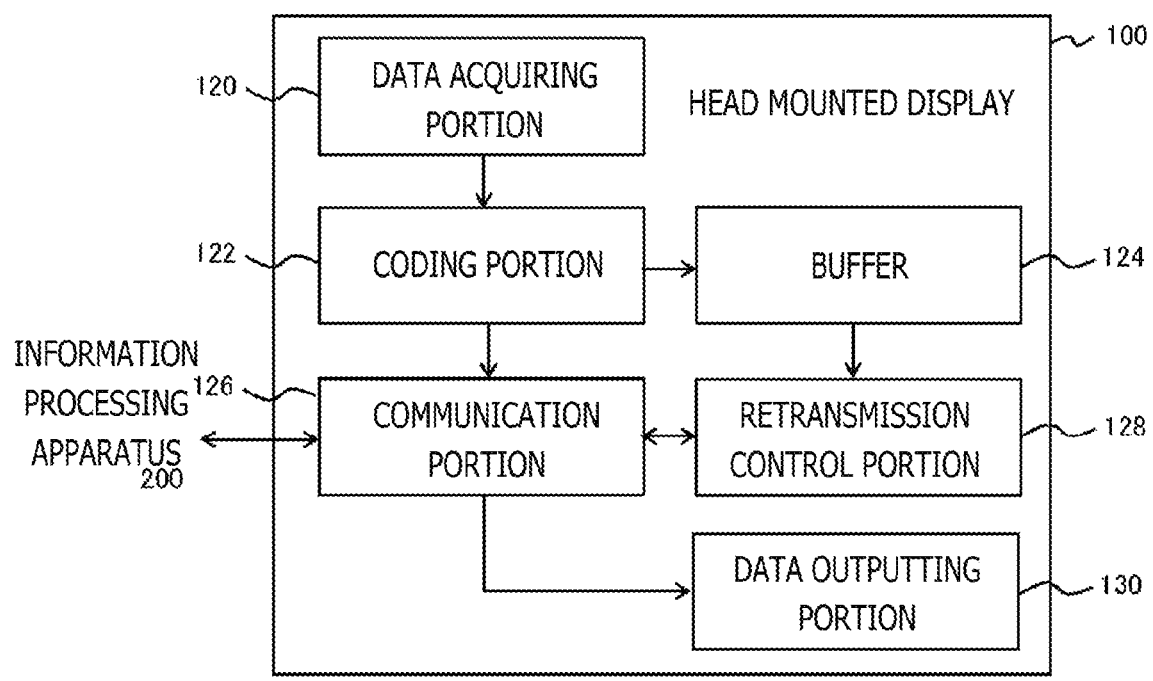
FIG. 8 is a block diagram depicting a configuration of functional blocks of the head mounted display in the embodiment.

FIG. 8 depicts a configuration of functional blocks of the head mounted display 100 in the embodiment. The functional block depicted in FIG. 8 and FIG. 9 which will be described later can be realized by the various kinds of mechanisms depicted in FIG. 2 or FIG. 4 in terms of the hardware, and can be realized by a program which is loaded from the recording medium or the like into the memory, and which exhibits the functions such as the data analysis function and the image processing function in terms of the software. Therefore, it is understood by a person skilled in the art that these functional blocks can be realized in the various forms by only the hardware, only the software, or the combination thereof, and is by no means limited to any of those.

The head mounted display 100 includes a data acquiring portion 120, a coding portion 122, a buffer 124, a communication portion 126, a retransmission control portion 128, and a data outputting portion 130. In this case, the data acquiring portion 120 serves to acquire the photographed image from the camera 110. The coding portion 122 serves to code the photographed image. The buffer 124 serves to temporarily store the coded data. The communication portion 126 is an interface through which the data is transmitted/received to/from the information processing apparatus 200. The retransmission control portion 128 serves to process the retransmission request from the information processing apparatus 200. The data outputting portion 130 serves to output the display image or the like.

The data acquiring portion 120 is composed of the camera 110, the control portion 10, and the like of FIG. 2, and acquires the data associated with the images which are obtained by photographing the space in the field of view at the predetermined frame rate. In the case where the camera 110 is composed of the stereoscopic cameras as depicted in FIG. 1, the photographed images become a pair of parallax images having the field of view corresponding to the left eye and the right eye of the user who wears the head mounted display 100. However, the embodiment is by no means limited thereto in gist, and the moving image at one point of view may be photographed with a monocular camera. The data acquiring portion 120 supplies the pixel values in order of the pixels from which the pixel values can be acquired to the coding portion 122.

The coding portion 122 is composed of the control portion 10 and the like, and subjects the data associated with the photographed image acquired by the data acquiring portion 120 to the compression coding in accordance with the predetermined coding system such as Joint Photographic Experts Group (JPEG). The buffer 124 is composed of the storage portion 50, and temporarily preserves the data associated with the photographed image subjected to the compression coding so as to prepare for the retransmission request. The communication portion 126 is composed of the communication control portion 40, the antenna 44, and the like, and packetizes the data associated with the photographed image subjected to the compression coding every transmission unit, and transmits the resulting data to the information processing apparatus 200. As depicted in FIG. 5, the data is coded in order of the pieces of data which can be acquired by the image pickup element, packetizes the resulting data in the transmission unit to transmit the resulting data, thereby enabling the photographed image to be transmitted at a low latency.

The communication portion 126 also receives the retransmission request for the packet concerned which is issued when the information processing apparatus 200 detects the packet loss, and informs the retransmission control portion 128 of this effect. The retransmission control portion 128 reads out the data in the transmission unit corresponding to the packet specified in the retransmission request from the buffer 124, and supplies the resulting data to the transmission portion 126. The transmission portion 126 packetizes the data concerned again to transmit the resulting data, thereby realizing the retransmission processing for the lost packet. The transmission portion 126 further receives the data associated with the display image or the output sound which is transmitted from the information processing apparatus 200, and supplies the data thus received to the data outputting portion 130. The data outputting portion 130 is composed of the control portion 10, the display 30, and the like, and carries out the display of the display image, or the sound output.

Figure 9:
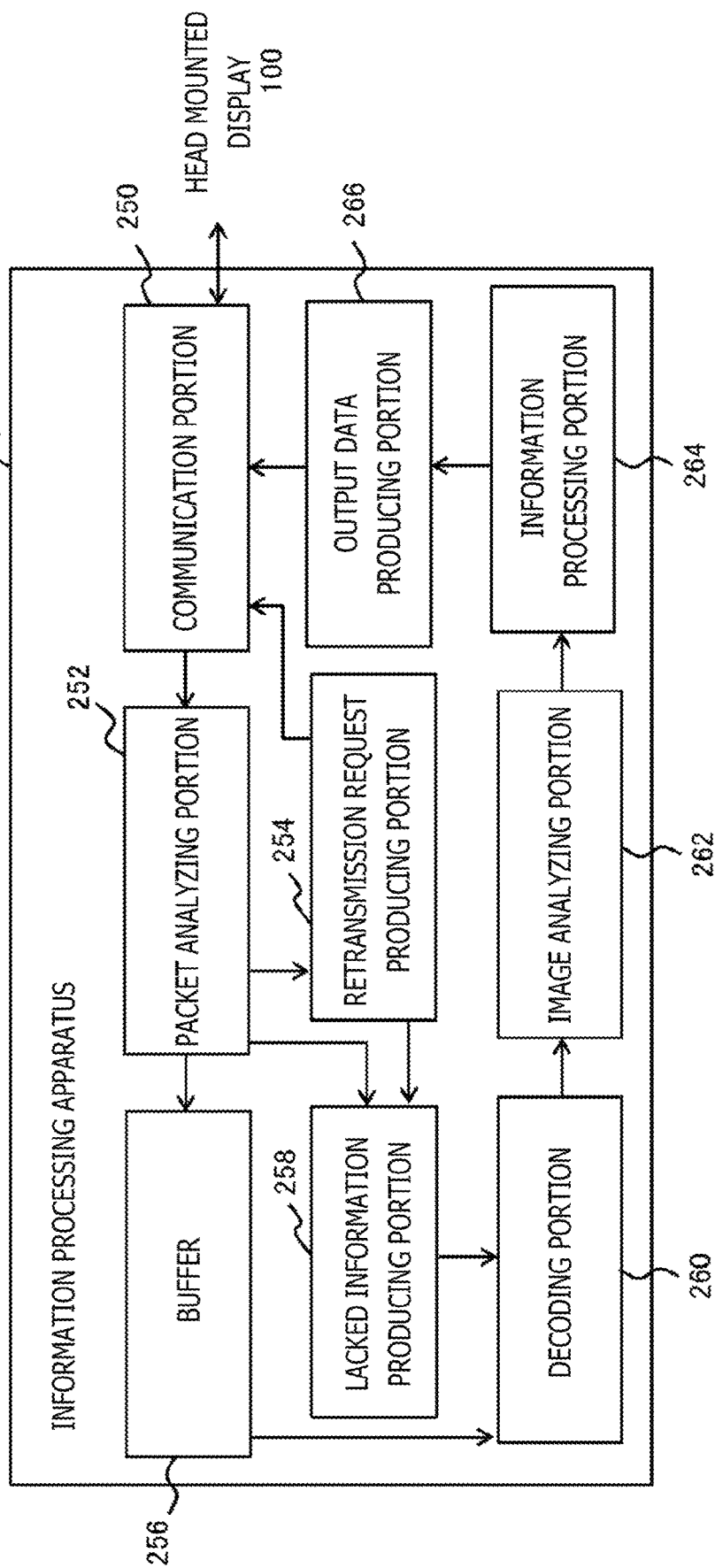
FIG. 9 is a block diagram depicting a configuration of functional blocks of the information processing apparatus in the embodiment.

FIG. 9 depicts a configuration of functional blocks of the information processing apparatus 200 in the embodiment. The information processing apparatus 200 includes a communication portion 250, a packet analyzing portion 252, a retransmission request producing portion 254, a buffer 256, a lacked information producing portion 258, a decoding portion 260, an image analyzing portion 262, an information processing portion 264, and an output data producing portion 266. In this case, the communication portion 250 is an interface through which the data is transmitted/received to/from the head mounted display 100. The packet analyzing portion 252 serves to analyze the packet transmitted from the head mounted display 100. The retransmission request producing portion 254 serves to produce the retransmission request for the lost packet. The buffer 256 serves to temporarily store the data associated with the photographed image transmitted thereto. The lacked information producing portion 258 serves to produce information pertaining to the occurrence situation of the data lack. The decoding portion 260 serves to decode the data associated with the photographed image. The image analyzing portion 262 serves to carry out the predetermined analysis for the decoded photographed image. The information processing portion 264 serves to execute the predetermined information processing by using the analysis result. In addition, the output data producing portion 266 serves to produce the data to be outputted such as the display image.

The communication portion 250 is composed of the communication portion 232, the CPU 222, and the like of FIG. 4, and receives the packet which is transmitted from the head mounted display 100 and which includes the data associated with the photographed image. In addition, the communication portion 250 transmits the retransmission request for the packet which is produced by the retransmission request producing portion 254, and the data associated with the display image or the output sound which is produced by the output data producing portion 266 to the head mounted display 100.

The packet analyzing portion 252 is composed of the CPU 222 and the like, and successively acquires the packets transmitted thereto from the head mounted display 100 and analyzes the packets thus acquired. Specifically, the packet analyzing portion 252 detects the packet which is lost in the data transmission based on the identification information (hereinafter, referred to as "the packet Identification (ID)") given every packet. In addition, the packet analyzing portion 252 separates the header information containing the packet ID and the like, and the data main body from each other, and stores the latter in the buffer 256 so as to be associated with the position on the image plane.

In the case where the loss of the packet occurs, the packet analyzing portion 252 informs the retransmission request producing portion 254 of the packet ID concerned. The retransmission request producing portion 254 is composed of the CPU 222 and the like, and produces the retransmission request containing the lost packet ID. The retransmission request concerned is transmitted to the head mounted display 100 through the communication portion 250. In the example of FIG. 6, the packet corresponding to the transmission unit such as "R2" or "L3" is specified to issue the retransmission request.

Although the retransmission request producing portion 254 may repeat the retransmission request until the lost packet can be acquired, the retransmission request producing portion 254 determines the time out if a predetermined allowable time elapses with the specified packet being not acquired, and thereafter, the retransmission request producing portion 254 does not make out the retransmission request about the packet concerned. For this reason, the retransmission request producing portion 254 holds a set value of the allowable time in an internal memory. The lacked information producing portion 258 is composed of the CPU 222 and the like, and produces the information pertaining to the data which could not be acquired even when the allowable time described above elapses (hereinafter, referred to as "the lacked information").

The lacked information basically represents which position on the image to what degree the data lack occurs. For this extent, the lacked information producing portion 258 successively acquires the information pertaining to the data in the lacked transmission unit from the packet analyzing portion 252, and acquires a timing at which the allowable time expires from the retransmission request producing portion 254, thereby finally specifying the portion in which the data was lacked. Since in the more forward portion in transmission order, the allowable time early expires, the lacked information can be produced synchronously with the processing start of the corresponding area. The lacked information thus produced is successively supplied to the decoding portion 260.

The decoding portion 260 is composed of the CPU 222 and the like, and successively reads out the data main body from the buffer 256 to decode the data main body, thereby restoring the photographed image. The transition of the data as depicted in FIG. 6 is successively realized by the packet analyzing portion 252, the buffer 256, and the decoding portion 260. In this case, in the lacked information acquired from the lacked information producing portion 258, predetermined invalid data is substituted for the pixel which is proved as the lacked portion. The decoding portion 260 associates the data associated with the restored photographed image with the lacked information, and supplies the resulting data to the image analyzing portion 262.

The image analyzing portion 262 is composed of the CPU 222 and the like, and carries out the predetermined image analysis for the data associated with the photographed image restored by the decoding portion 260. The contents of the analysis carried out here are variously considered depending on the contents of the information processing in the subsequent stage, the object of the photographing, the contents of the display, and the like. For example, for the purpose of acquiring the position and posture of the head of the user, the v-SLAM described above is carried out, and for the purpose of acquiring the position in the real space of the subject, the stereoscopic matching is carried out by using the right and left parallax images to produce a depth image. The depth image is an image in which a distance of a subject from a camera is expressed in the form of a pixel value of a corresponding image on a photographed image. The depth image is obtained by extracting corresponding points from the parallax image, and calculating a distance in accordance with the principle of triangulation based on the parallax between both of them.

Alternatively, the three-dimensional modeling of the real object lying in the photographed space is carried out by using the depth image. The real object is modeled as the object in the computational three-dimensional space, thereby enabling AR in which the virtual object and the real object interact with each other to be realized. Alternatively, an image of the real object having a predetermined shape or color may be detected based on the template matching, or people or goods may be recognized based on the feature of the details such as the face.

The image analyzing portion 262 suitably differentiates in processing contents the portion in which the data is lacked due to the packet loss from other areas by referring to the lacked information in such an image analysis. For example, the portion in which the data is lacked is excluded from the area of the analysis object such as the object of the corresponding point retrieval for the production of the depth image, or the subject of the template matching for the detection of the subject. Alternatively, after the analysis is carried out similarly to other cases, the result about the portion in which the data is lacked may be prevented from being outputted, and so forth, or additional information having a possibility of the low accuracy in the portion concerned may be low may be produced.

It should be noted here that "the portion in which the data is lacked" may mean a portion in which there is truly no data, or may mean an area in which a falling rate when the image plane is divided into parts in accordance with a predetermined rule is higher than a predetermined threshold value. In any case, the image analyzing portion 262 recognizes the portion in which the data is lacked and can differentiate the analysis processing itself or a utilization form of the analysis result from other cases, resulting in that a change for the worse of the processing accuracy due to the lack of the data can be kept to a minimum.

That is, the area which is analyzed with the low accuracy because no data is obtained is handled similarly to the analysis results of other areas, resulting in that the accuracy of the processing can be prevented from being reduced in the entire image. In addition, the portion in which the data is lacked is excluded from the analysis object such as the corresponding point retrieval, resulting in that the unnecessary processing in which the reflection on the result is not preferable can be reduced. These ways of handling are guaranteed, resulting in that even when the allowable time for the retransmission request is shortened, the bad influence is suppressed, and thus the accuracy and the currency are compatible with each other.

The information processing portion 264 is composed of the CPU 222 and the like, and executes the predetermined information processing such as the game by utilizing the result of the image analysis. As described above, the contents of the predetermined information processing is not especially limited. The information processing Portion 264 may differentiate the analysis result of the portion exhibited by the image analyzing portion 262 from the reason that the portion has a possibility of the low analysis accuracy due to the data lack from other cases. For example, the subject in which an edge is contained in such a portion is excluded from the calculation object, or an object is not drawn in such a portion. As a result, the change for the worse of the analysis accuracy of a Partial area can be prevented from being propagated to other processing, or the gaze of the user can be induced to another portion.

The output data producing portion 266 is composed of the CPU 222, the GPU 224 and the like, and produces the data associated with the image to be displayed or the sound to be outputted on or to the head mounted display 100 as a result of the processing executed by the information processing portion 264. For example, the output data producing portion 266 draws the virtual world in which the field of view is changed in response to the motion of the head of the user, or produces the sound data in the virtual world concerned. The data thus produced is successively transmitted to the head mounted display 100 through the communication portion 250.

Figure 10:
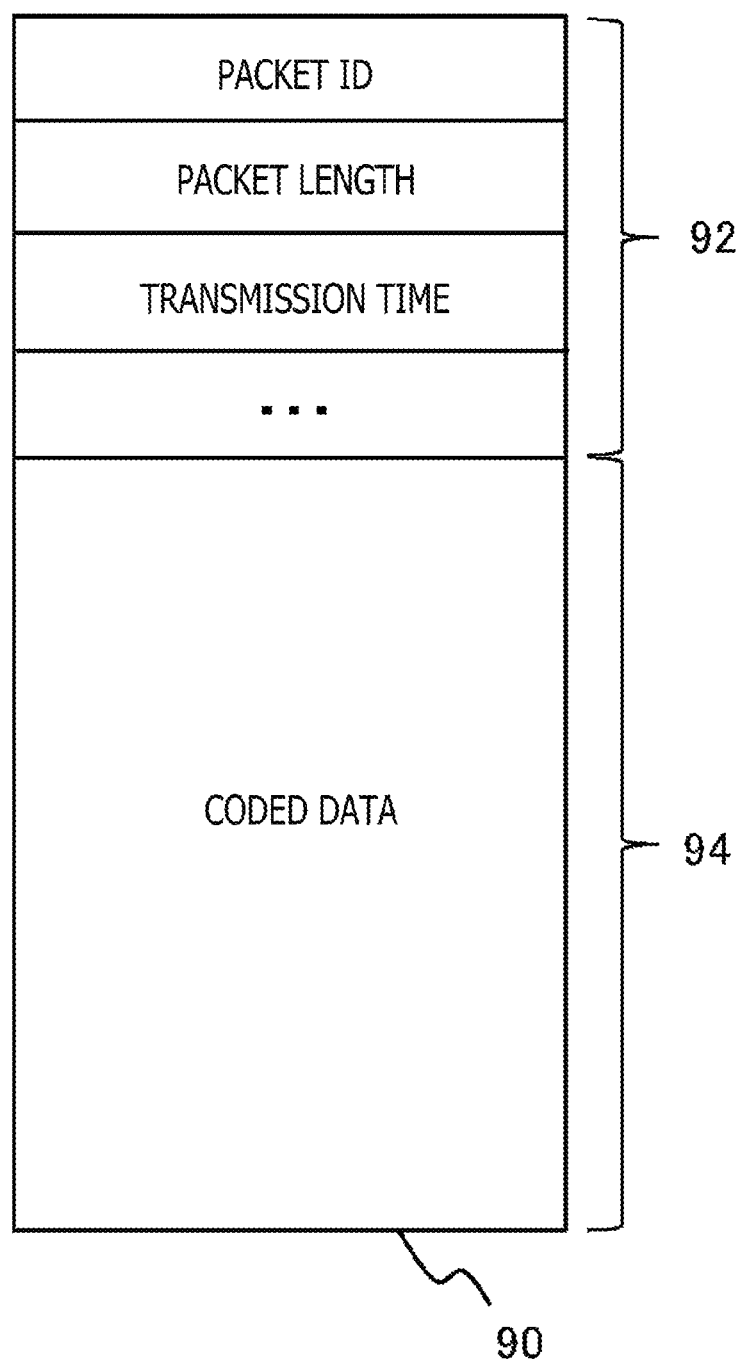
FIG. 10 is a diagram depicting an example of a data structure of a packet which is transmitted from the head mounted display to the information processing apparatus in the embodiment.

FIG. 10 depicts an example of a data structure of a product which is transmitted from the head mounted display 100 to the information processing apparatus 200 in the embodiment. A packet 90 depicted in the figure represents one of the packet columns depicted in the upper stage of FIG. 5 and FIG. 6. Thus, the data for one transmission unit of the photographed image is transmitted based on the packet 90. The packet 90 is composed of a packet information portion 92 and an image data portion 94. The packet information portion 92 contains so-called header information such as "packet ID," "packet length," "transmission time," "Packet ID" is identification information which is uniquely given to all the packets produced for one frame of the photographed image. For example, the packet ID may be numbers of the ascending order such as "0," "1," "2," . . . which are given in the raster order to the transmission unit, or may be two-dimensional position coordinates in the image plane. Alternatively, the packet ID may be the head addresses of the transmission units when the image is developed in the memory. In addition, as depicted in FIG. 5 and FIG. 6, in the case where the photographed image of the left point of view, and the photographed image of the right point of view are alternately sent, moreover, an identifier for distinguishing which of the images the packet belongs to is added to the packet ID.

"Packet length" is a data size of the packet 90. "Transmission time" is a time stamp exhibiting the time at which the packet 90 is transmitted from the head mounted display 100. In addition thereto, other pieces of information may be suitably contained in the packet information portion 92 depending on the adapted communication protocol.

The data, in the transmission unit of the photographed image, which is subjected to the compression coding by the coding portion 122 of the head mounted display 100 is stored in the image data portion 94. The packet analyzing Portion 252 divides the packet 90 transmitted thereto into the packet information portion 92 and the image data portion 94, and stores the data of the latter in the buffer 256 so as to be associated with the position on the image. The information pertaining to the grant rules of the packet ID is shared with the head mounted display 100, thereby enabling the positions on the image of the pieces of data to be specified based on the packet ID. Therefore, the data within the packet which can be acquired without being lost is stored in the buffer 256 so as to be associated with the position on the image.

The packet analyzing portion 252 also confirms the packet ID of the packet information portion 92 in comparison with the transmitted order, thereby detecting the loss of the packet. For example, in the case where the numbers of the ascending order are given as the packet ID, the missing can be detected by comparing the arrival order of the packets, and the packet ID with each other. The packet analyzing portion 252 informs the retransmission request producing portion 254 of the ID of the lost packet detected in such a manner, thereby producing the retransmission request. The lacked information producing portion 258 is also informed of the information associated with the lost packet or the newest information Pertaining to the position on the image of the data associated with that information, thereby producing the lacked information with the expiration of the allowable time.

Figure 11:
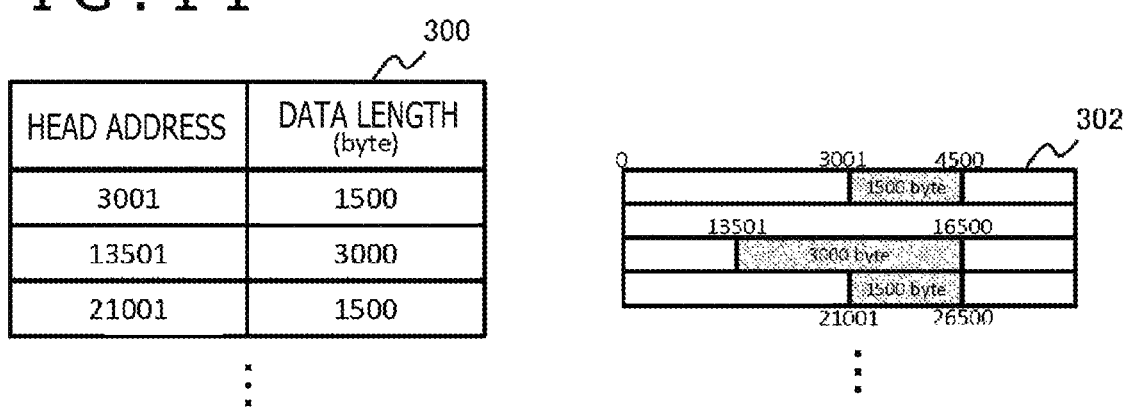
FIG. 11 is a diagram exemplifying a data structure of lacked information which a lacked information producing portion of the information processing apparatus produces in the embodiment.

FIG. 11 exemplifies a data structure of the lacked information which is produced by the lacked information producing portion 258 of the information processing apparatus 200. This example directly exhibits an address of the area, in which the data corresponding to the lost packet should be stored, of the storage area 302 of the image data contained in the buffer 256. That is, a lacked information 300 is composed of "head address" and "data length" of the lacked portion. For the lacked portion, the data transmitted in one packet, that is, the transmission unit is recognized as a minimum particle size. Then, if the packets are continuously lost, then, a numerical value of "data length" in the lacked information 300 is increased.

This example exhibits that the data of (3001, 1500), (13501, 3000), (21001, 1500), . . . in order of (head address, data length) is lacked. If this is expressed in the storage area 302 of the image data, then, it is understood that the hatched portions, that is, the data in the portions of 1500 bytes of 3001 bytes to 4500 bytes, 3000 bytes of 13501 bytes to 16500 bytes, 1500 bytes of 21001 bytes to 26500 bytes, . . . is lacked. Since the storage area 302 of the image data is associated with the image plane, the exhibition of the address of the storage area shall thus specify the corresponding portion of the image plane.

If the transmission unit is 1500 bytes, then, this example means that third packet, 10-th packet and 11-th packet, and 15-th packet are lost. The lacked information producing portion 258 derives a set of (head address, data length) from ID of such a lost packet, thereby producing the lacked information 300. Then, by referring to the lacked information concerned, the decoding portion 260 substitutes the invalid data as the pixel value for the lacked portion, or the image analyzing portion 262 differentiates the lacked information from other pieces of information, thereby carrying out the analysis.

FIG. 12 depicts another example of the data structure of the lacked information which is produced by the lacked information producing portion 258 of the information processing apparatus 200. This example exhibits the falling rate of the data every block obtained by dividing the image plane. Specifically, the lacked information 304 is composed of header information 306a, and a lacked information main body 306b. The header information 306a is composed of "the number of rows" and "the number of columns" of the blocks obtained by equally dividing an image plane 308, and "the total data length" of the image.

In the depicted example, the image plane 308 is divided into 6 rows×8 columns. In addition, the total data length is 1 M bytes. The number of divisions of the image plane is determined based on the analysis contents, the properties of the photographed image, and the like. The lacked information main body 306b is composed of the coordinates of the block including the "row" number, and the "column" number, "the data length" of each of the blocks, and the "falling rate" of the data. The row number and the column number, as depicted in the blocks of the image plane 308, represent one block in pair of those. In the case where the image plane is divided into 6 rows×8 columns, the row number is in the range of 0 to 5, and the column number is in the range of 0 to 7.

The data length of the block represents a size of the data contained in each of the blocks and obtained by the compression coding. In the case where the variable length coding is carried out, as depicted in the figure, the data length differs every block. The falling rate represents the rate of the data lacked within the block. For example, the block of 0 row×0 column represents that the data of 10% of the data of 20000 bytes, that is, the data of 2000 bytes is lacked.

Since the lacked information depicted in FIG. 11 directly represents the address of the portion in which the data is lacked, the differentiation of the analysis processing can be carried out with the finer particle size while as the number of intermittent lacks is further increased, the number of entries is increased, and the data size of the lacked information becomes large. With the lacked information 304 of FIG. 12, the degree of lack is grasped in area unit of the predetermined area, thereby enabling the data size of the lacked information to be made constant. For this reason, in the case where the information with the fine particle size is not regarded as important such as the case where the low resolution image is used in the image analysis, the format in the figure becomes advantageous.

FIG. 13 depicts still another example of the data structure of the lacked information which is processed by the lacked information producing portion 258 of the information processing apparatus 200. Although similarly to the case of FIG. 12, this example represents the falling rate of the data every block obtained by dividing the image data, as the division criteria of the block, instead of the area on the image, the size of the coded data is fixed. That is, as depicted in a storage area 314 of the image data, the addresses are equally divided on the storage area. In this case as well, the lacked information 310 is composed of header information 312a, and a lacked information main body 312b.

The header information 312a is composed of the "data length" of one block as the division unit, the "number of blocks" obtained through such division, and the "total data length" of the image. The example depicted in the figure represents that the image data of 240 k bytes is divided every 10 k bytes, and as a result, the storage area 314 is divided into 24 blocks. The data length of the division unit is determined based on the analysis contents, the properties of the photographed image, and the like.

The lacked information main body 312b is composed of "head address" of each of the blocks, and "falling rate" of the data in each of the blocks. For example, the block in which the head address is "0" represents the data of 20% of the data of 10 k bytes, that is, the data of 2000 bytes is lacked. Since similarly to the case of FIG. 11, the storage area 314 of the image data is associated with the image plane, the data falling rate of each of the blocks in the storage area exhibits the data falling rate of the corresponding area of the image plane.

Since similarly to the case of FIG. 12, even in this example, the degree of the lack is represented with the particle size larger than the particle size in the transmission unit which is transmitted in one packet, the size of the lacked information can be fixed irrespective of the lack situation. In addition, in the case where the variable length coding is carried out, the division unit is prescribed by the data size, realizing in that in the area in which the data size after the compression is larger, the area on the image corresponding to one block becomes small. Therefore, in the portion in which the image structure is more complicated because the high-frequency components are contained, and so forth, the situation of the data lack can be reflected on only the analysis processing in the finer units.

Since the pieces of lacked information depicted in FIG. 11 to FIG. 13, as described above, have the respective properties, the optical form is selected in response to the structure of the space becoming the photographing object, the contents of the image analysis to be carried out, the resolution of the image used in the image analysis, the accuracy required for the analysis, the characteristics of the hardware such as the memory capacity and the process performance, and the like. For example, in the case where the detailed features need to be extracted by the face recognition or the like, it is considered to produce the lacked information in the form depicted in FIG. 12 or FIG. 13 in the case where a surface of a table or the like lying in the space to be photographed is roughly modulated in the form depicted in FIG. 11.

In the embodiment which has been described so far, the lacked information was produced for the portion for which the retransmission request was made for the packet lost in the allowable time previously determined, and the data could not be obtained even in such a manner. By carrying out the image analysis based on such a situation, even when the allowable time is restrictive, the analysis result as the best effect is acquired, and the analysis result which is considered to be low in accuracy is treated so as to be differentiated from other causes, thereby enabling the influence to be prevented from being exerted on the whole analysis result. Here, for the allowable time, such a time as that a shift between a motion in the photographed space, and a motion of the display image is not recognized becomes the upper limit.

Figure 14:
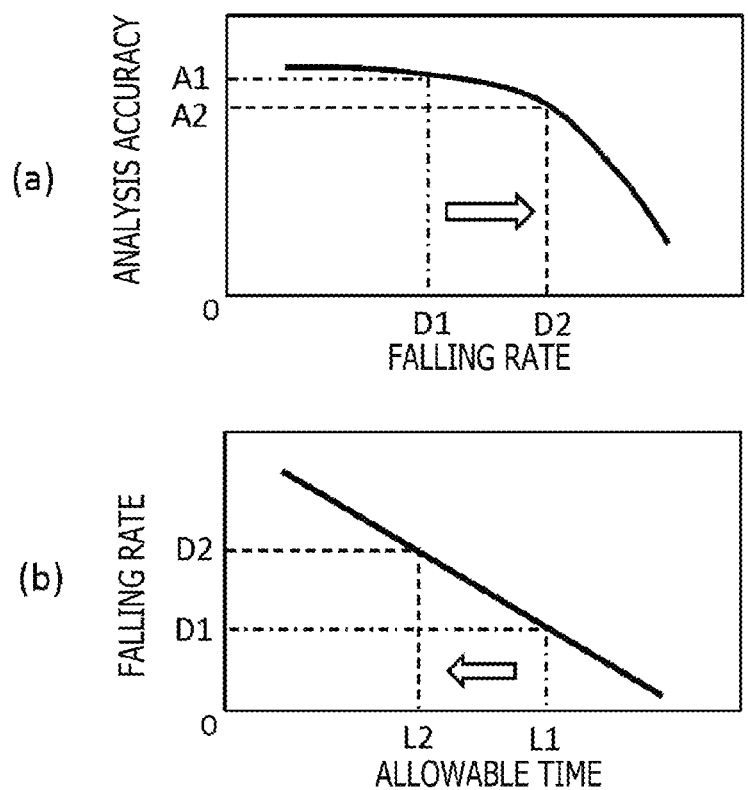
FIG. 14 is a graphical representation explaining a relationship between an allowable time and analysis accuracy in the image data transmission in the embodiment.

On the other hand, as depicted in FIG. 7, since as the allowable time is shorter, the falling rate of the data is increased, the shortening of the allowable time causes deterioration of analysis accuracy. FIG. 14 is a graphical representation explaining a relationship between the allowable time and the analysis accuracy. FIG. 14(a) exemplifies a change in analysis accuracy with respect to a change in data falling rate, and FIG. 14(b), similarly to FIG. 7, exemplifies the data falling rate with respect to a change in time which is allowed for the retransmission request. In the example depicted in FIG. 14(a), even when the data falling rate is increased from D1 to D2, a change in analysis accuracy is relatively so small as to be depicted from A1 to A2. Thus, in the case where even when the analysis accuracy is at A2, a large influence is not exerted on the information processing or display in the subsequent stage, even the falling rate of D2 is allowed.

In this case, even when as depicted in FIG. 14(b), the allowable time for the retransmission request is changed from L1 to L2, it may be said that a bad influence is not exerted on the information processing. If the allowable time can be shortened in such a way, then, the currency of the display can be increased, and the more resources can be used in other information processing or transmission. Then, a mechanism for adjusting the allowable time for the retransmission request based on the change in accuracy of the image analysis may be provided by utilizing such a relationship. Contrary to this, an algorithm for the image analysis may be optimized by using the given allowable time. Moreover, the parameter of the coding processing in the head mounted display 100 may be adjusted in response to the optimized allowable time.

Figure 15:
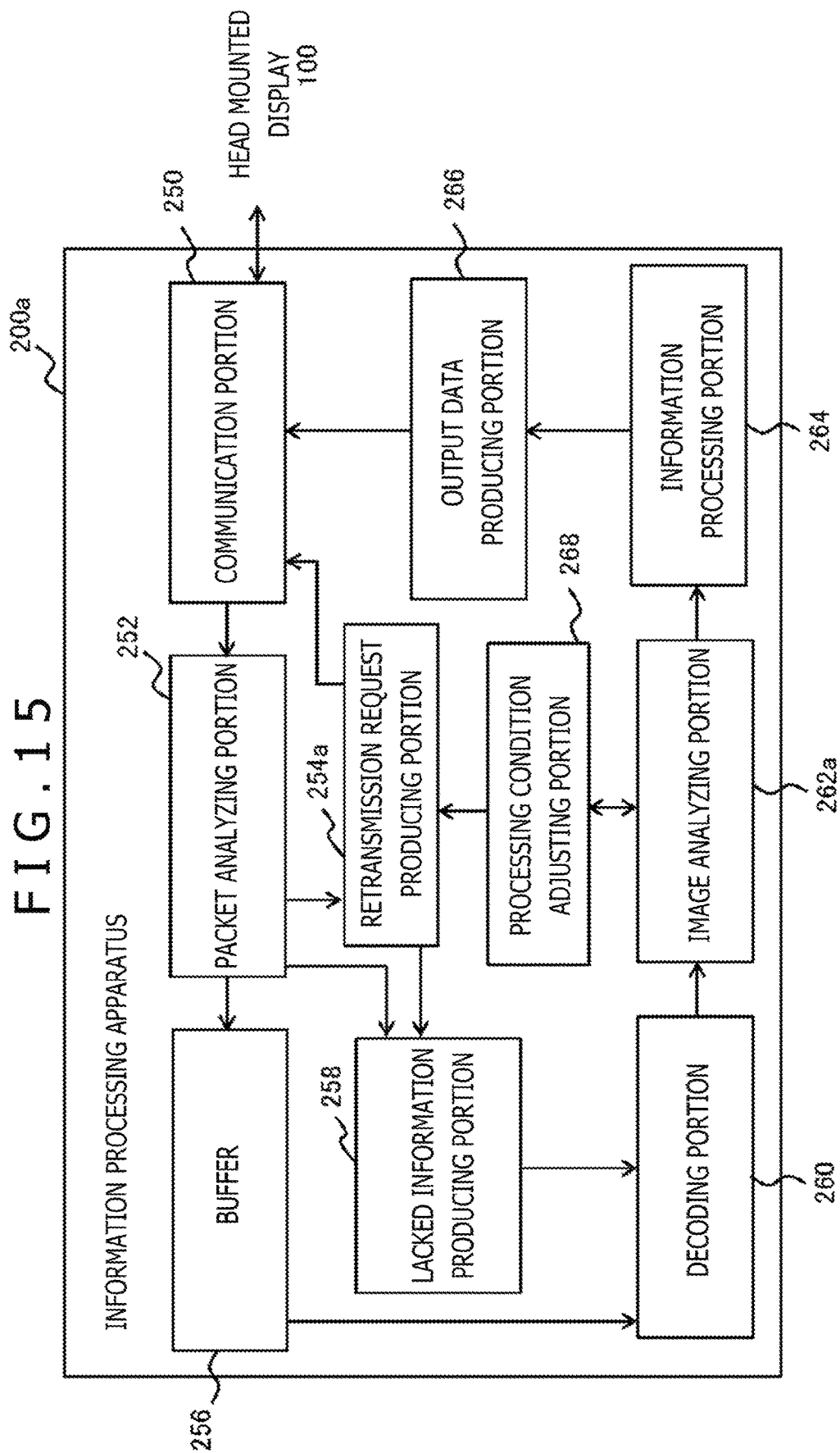
FIG. 15 is a block diagram depicting a configuration of functional blocks of the information processing apparatus having functions of adjusting a retransmission allowable time of a lost packet due to accuracy of image analysis in the embodiment.

FIG. 15 depicts a configuration of functional blocks of the information processing apparatus having functions of adjusting the retransmission allowable time for the lost packet depending on the accuracy of the image analysis. It should be noted that the blocks having the same functions as those of the information processing apparatus 200 depicted in FIG. 9 are assigned the same reference symbols and a description thereof is suitably omitted here. An information processing apparatus 200a, similarly to the case of the information processing apparatus 200 in FIG. 9, includes the communication portion 250, the packet analyzing portion 252, the buffer 256, the lacked information producing portion 258, the decoding portion 260, the information processing portion 264, and the output data producing portion 266. The information processing apparatus 200a further includes a retransmission request producing portion 254a, an image analyzing portion 262a, and a processing condition adjusting portion 268.

The basic functions of the retransmission request producing portion 254a and the image analyzing portion 262a are similar to those of the retransmission request producing portion 254 and the image analyzing portion 262 of the information processing apparatus 200 depicted in FIG. 9. However, the image analyzing portion 262a feeds back the accuracy of the image analyzing processing executed by itself to the processing condition adjusting portion 268. After the processing condition adjusting portion 268 associates the accuracy of the processing concerned, and the lacked information of the data with each other, the processing condition adjusting portion 268 adjusts the set value of the allowable time so as to allow the falling rate in the range in which the necessary accuracy is maintained. The retransmission request producing portion 254a accepts the adjustment of such an allowable time.

When in the example depicted in FIG. 14, the lower limit allowed for the analysis accuracy is A2, the processing condition adjusting portion 268 reduces the allowable time in a direction toward L2 within the range of the falling rate in which the accuracy does not fall below A2. For example, at the timing of reception of a new frame, the set value of the allowable time is reduced by a predetermined increment ΔL, and carries out the retransmission request within the allowable time concerned. The reduction of the allowable time results in that the falling rate of the data is increased.

However, when the image of the new frame acquired in such a manner is analyzed, the allowable time is further reduced unless the accuracy falls below A2. This processing is repetitively executed until the accuracy reaches A2, thereby obtaining the shorter value of the allowable time for which the necessary accuracy can be maintained.

Incidentally, in addition to the technique with which the allowable time at a time point at which the allowable time is gradually reduced in such a manner and the accuracy reaches the lower limit is set as the set value, there may be adopted such a technique that the allowable time is changed in the large range to some extent to acquire a relationship between the allowable time and the analysis accuracy, and thus the allowable time corresponding to the lower limit of the analysis accuracy is estimated. In any case, such adjustment processing is executed not only at the time of the development or the manufacture of the information processing apparatus or the head mounted display, but also at the time of the operation of the system by the user.

That is, the shortest allowable time for which the suitable accuracy can be maintained depends on not only the hardware such as the sensitivity of the image pickup element of the camera, the data correction processing, the coding processing, and the communication environment of the inside of the camera, and the processing performance of the information processing apparatus, but also the situations such as the contents of the image analysis, the brightness of the circumferences, the photographing conditions, and the quantity and colors of goods in the photographed space. The reason for this is because the graphs depicted in FIG. 14 are changed based on these conditions. Therefore, the allowable time is optimized at the various timing, resulting in that while the influence exerted on the processing accuracy is kept to a minimum, the transmission environment can be optimized.

For example, when the user plays the electronic game by using the information processing apparatus 200a, if in the initial stage of the electronic game, the allowable time is adjusted in the background, then, it is possible to realize the processing under the optimal conditions conforming to the contents of the game, and the actual operation environment. Incidentally, it is only necessary that the "analysis accuracy" is some sort of index representing the strictness of the image analysis, and thus as depicted in FIG. 14, the analysis accuracy may not be such a numerical value as to be continuously obtained.

That is, if a boundary for determining right and wrong of the allowable time from a viewpoint of the accuracy can be set, the boundary may not be given in the form of a numerical value. For example, two events as to whether or not the real object such as the hand which is essentially to be detected is detected may be made the "analysis accuracy." In this case, the turn of these events is the boundary, and thus it is only necessary to obtain the shortest allowable time in a state in which the real object concerned is detected. The allowable time which is actually set may also be a value obtained by adding the predetermined margin to the time acquired in such a manner. If the image analysis is the production of the depth image, then, the two events as to whether or not the corresponding point is detected may be available, or a numerical value such as the image average of the degree of similarity when the corresponding point is detected may also be available.

In addition, such analysis accuracy may also be acquired in the form of a distribution in the image plane. As a result, the allowable time can be more finely adjusted in response to the information as to where the analysis accuracy becomes worse. For example, even when the accuracy falls below the lower limit in the image edge having the low importance, if the accuracy is maintained at the more important image center in the area in which the tracking object is present, and the like, then, it becomes possible to further shorten the allowable time. If the allowable time is optimized in such a way, then, the conditions for the various kinds of pieces of processing in the head mounted display 100 may be adjusted in response to the optimization.

Figure 16:
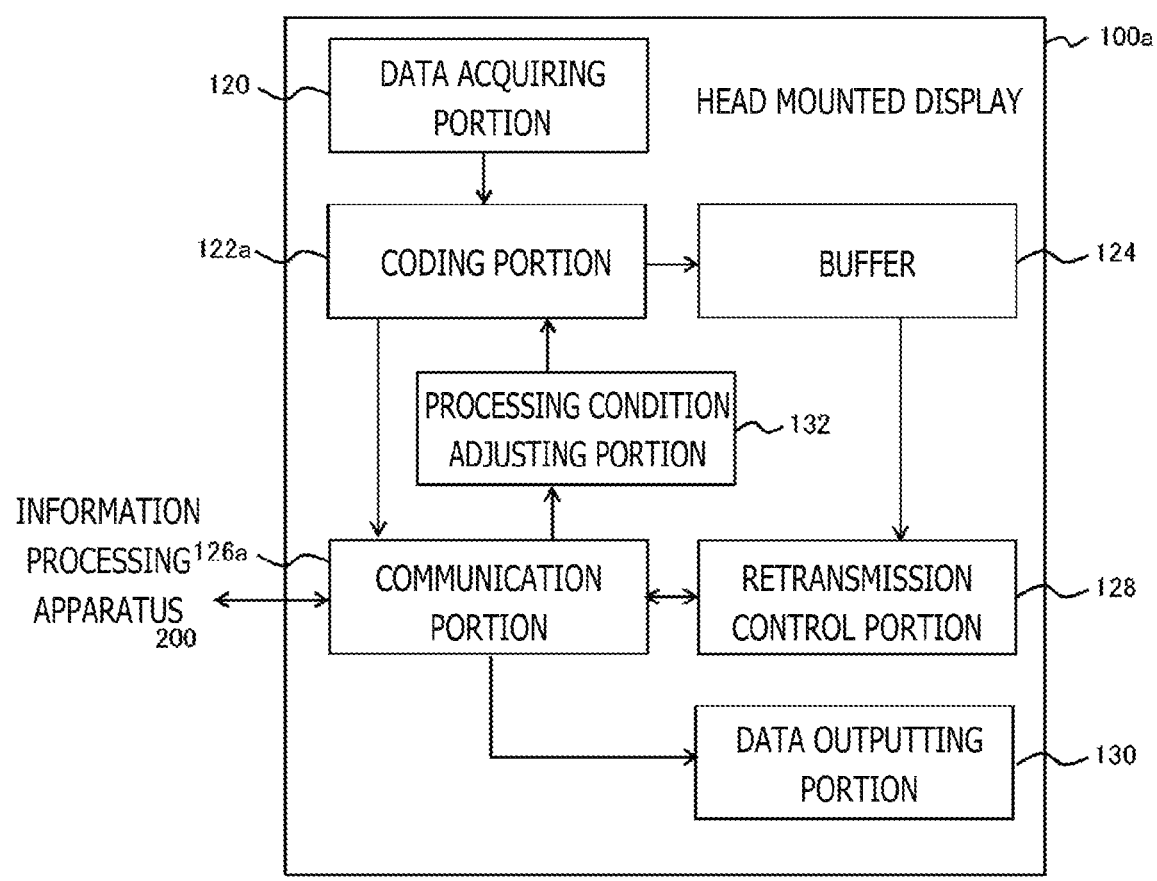
FIG. 16 is a block diagram depicting a configuration of the functional blocks of the head mounted display having functions of adjusting an internal processing condition by the retransmission allowable time of the lost packet in the embodiment.

FIG. 16 depicts a configuration of functional blocks of a head mounted display 100 having functions of adjusting the internal processing conditions based on the retransmission allowable time of the lost packet. Incidentally, blocks having the same functions as those of the head mounted display 100 depicted in FIG. 8 are assigned the same reference symbols, and a description thereof is suitably omitted here. The head mounted display 100a, similarly to the case of the head mounted display 100 of FIG. 8, includes the data acquiring portion 120, the buffer 124, the retransmission control portion 128, and the data outputting portion 130. The head mounted display 100a further includes a coding portion 122a, a communication portion 126a, and a processing condition adjusting portion 132.

The basic functions of the coding portion 122a and the communication portion 126a are similar to those of the coding portion 122 and the communication portion 126 depicted in FIG. 8. In this example, however, the parameter used in the compression coding is adjusted based on the allowable time for the packet retransmission. For this reason, the retransmission request producing portion 254a of the information processing apparatus 200 transmits the information associated with the allowable time which is finally decided by the processing condition adjusting portion 268 to the head mounted display 100a, and the communication Portion 126a of the head mounted display 100a receives that information. Then, the processing condition adjusting portion 132 determines a coding parameter in response to the allowable time concerned, and sets the coding parameter in the coding portion 122a.

The processing condition adjusting portion 132, for example, adjusts a compression ratio. Qualitatively, in such an unfavorable situation that the analysis accuracy cannot be obtained unless the allowable time is lengthened to reduce the data falling rate, the compression ratio is increased. As a result, if the size is reduced, then, the number of packets which shall be transmitted per one frame is reduced, and even with the same loss rate, the number of packets to be retransmitted can be reduced. If the adjustment of the allowable time is carried out again under such conditions, then, it is also possible that the allowable time can be shortened.

Contrary to this, in a satisfactory situation in which even when the allowable time shortened, the analysis accuracy is obtained, the compression ratio is lowered, thereby suppressing the deterioration of the image quality as well. The coding system itself may be switched over to a system in which the compression ratio is small and the deterioration of the image quality is less. As a result, there is suppressed a load applied to the processing for the coding in the head mounted display 100a. In the case where a power source is not supplied to the head mounted display 100a in a wired manner, the lightening of the processing load leads to an improvement as well in a battery life time due to the reduction of the power consumption.

Therefore, such a situation that the circumference is bright and the accuracy of the image analysis is easy to obtain is specified based on the optimized allowable time, and the compression ratio is adjusted in response to thereto, resulting in that the enhancement of the image quality, the saving of the battery consumption, and the like can also be attained. After the processing condition adjusting portion 132 holds information in which the allowable time, and the coded parameter or the coding system are associated with each other in an internal memory, and specifies the processing condition set in response to the allowable time transmitted from the information processing apparatus 200a, the processing condition adjusting portion 132 informs the coding portion 122a of this effect.

The coding portion 122a carries out the compression coding of the photographed image under the informed condition. It should be noted that the adjustment object by the processing condition adjusting portion 132 is by no means limited to the coded parameter or the coding system. For example, in the case where the data acquiring portion 120 includes such a function as to reduce the original image of the photographed image step by step and produce the photographed images having the different resolutions in an Image Signal at Processor (ISP) or the like, the processing condition adjusting portion 132 may switch the resolution of the image produced in the ISP, or the resolution of the image which should be transmitted to the information processing apparatus 200 over to another one in response to the adjusted allowable time.

In this case, in such a situation that the analysis accuracy is not obtained unless as the allowable time after the adjustment is longer, that is, the allowable time is lengthened and the data falling rate is made smaller, the image data having the low resolution is transmitted, thereby resulting in that the number of packets per one frame can be reduced to suppress the falling rate of the data. Then, if the adjustment of the allowable time is carried out again, then, it is also possible that the allowable time can be reduced.

Incidentally, as described above, by utilizing the fact that as the circumference is brighter, the accuracy of the image analysis is easy to obtain, the measured value of the illuminance may be utilized in the adjustment of the allowable time in the information processing apparatus 200a. In this case, an luminance sensor (not depicted) is provided in the head mounted display 100, and a measured value by the illuminance sensor is transmitted to the information processing apparatus 200. The information processing apparatus 200 carries out the adjustment in such a way that as the resulting illuminance is higher, the allowable time is shortened. From a diversified viewpoint, the optimal allowable time may be obtained in combination with the adjustment based on the analysis accuracy as described above.

Heretofore, the allowable time for the retransmission processing which has been described so far is set in the communication protocol, and is independent of the application. This setting is enabled to be adjusted based on the accuracy of the image analysis introduced by the application, thereby enabling a transmission aspect capable of flexibly coping with the update of the hardware or the change in photographed environment to be presented. On the other hand, as approach in a reverse direction, the algorithm of the image analysis may be switched over to another one in response to the allowable time set in accordance with the communication protocol.

In a word, the algorithm of the image analysis is switched over to such an analysis algorithm that when the allowable time is given in FIG. 14(b), the graph of FIG. 14(a) indicating the sufficient analysis accuracy with the falling rate of the data corresponding to the allowable time is obtained. The algorithm with which even when the falling rate is low, the analysis accuracy is obtained is qualitatively considered to be an algorithm in which the sensitivity of the processing is low. For example, a filter for edge detection is switched from a Sobel filter over to a Prewitt filter, next, a Roberts filter, resulting in that even when the influence of the data lacked portion can be suppressed, and the allowable time is insufficient, the accuracy can be maintained to some extent. Contrary to this, since in the case where the allowable time is relatively long, the falling rate of the data is reduced to a low level, the algorithm having the high sensitivity is used, thereby enabling the more accurate result to be obtained.

In this case, after the processing condition adjusting portion 268 of the information processing apparatus 200a holds the information in which the allowable time is associated with the analysis algorithm in the internal memory, and specifies the algorithm corresponding to the allowable time set in the retransmission request producing portion 254a, the processing condition adjusting portion 268 informs the image analyzing portion 262a of the effect. The image analyzing portion 262a analyzes the photographed image by using the informed algorithm. As a result, even if the specification of the communication protocol or hardware is changed or upgraded, an influence of this situation can be prevented from being executed on the image analysis, and thus the information processing or the displayed contents.

Incidentally, it is also considered that the analysis algorithm is not only switched so as to correspond to the allowable time given as the fixed value, but also associated with the allowable time adjusted in response to the environment or the like. For example, in the case where the mechanism for measuring the illuminance is provided in the manner as described above, the allowable time is adjusted in response to the illuminance, and thus the algorithm suitable for the adjusted allowable time can be selected.

Figure 17:
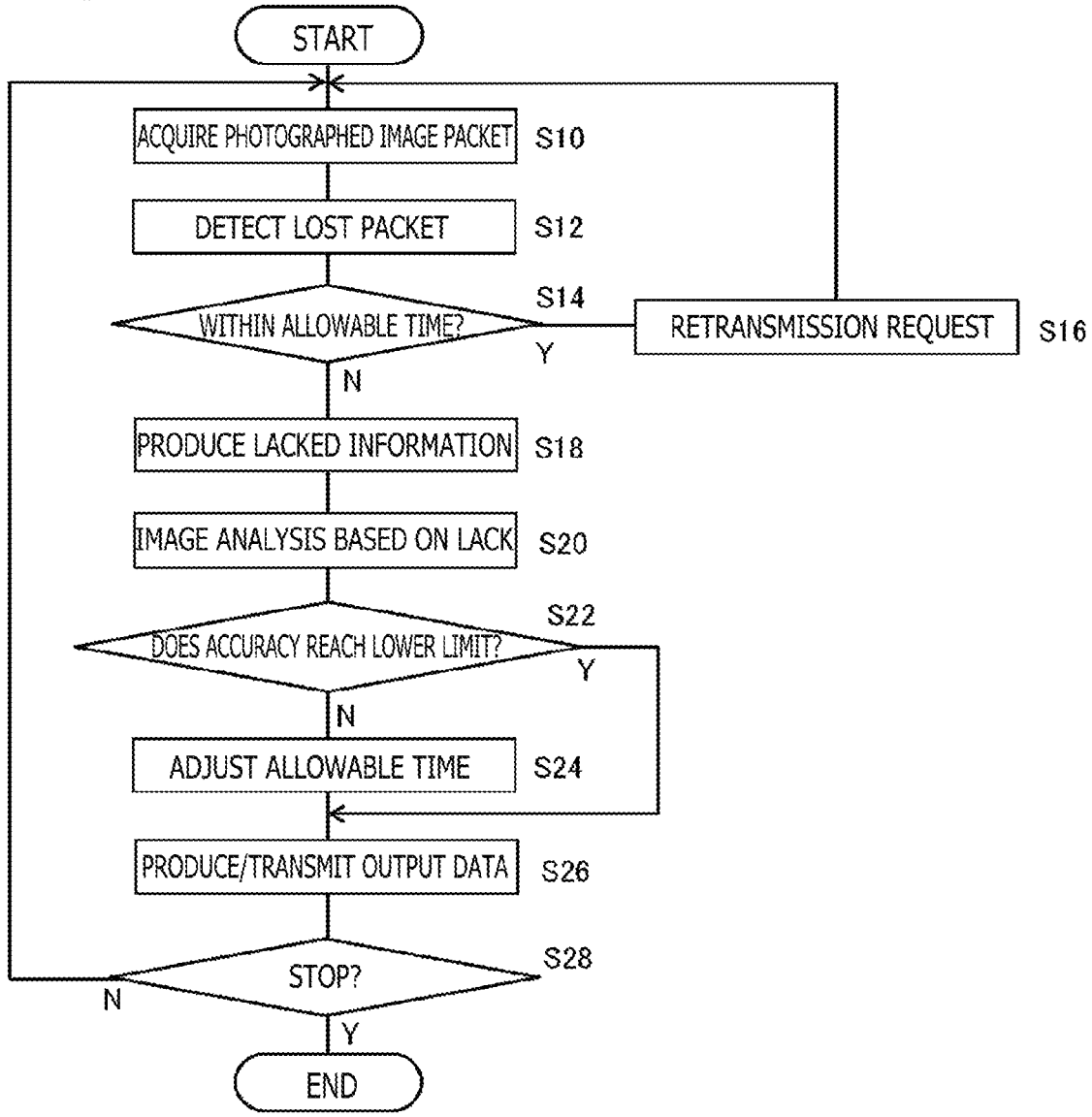
FIG. 17 is a flow chart depicting a processing procedure for producing output data based on data associated with the photographed image by the information processing apparatus in the embodiment.

Next, a description will now be given with respect to an operation of the information processing apparatus which can be realized by the configuration described above. FIG. 17 is a flow chart depicting a processing procedure for producing output data based on the photographed image by the information processing apparatus in the embodiment. It should be noted that although the figure depicts the operation of the information processing apparatus 200a including the function of adjusting the allowable time described in FIG. 15, in the case where there is supposed the information processing apparatus 200 not including the adjustment function depicted in FIG. 9, the pieces of processing in S22 and S24 are omitted.

Firstly, when the user turns ON the power source of the information processing apparatus 200a and the head mounted display 100 to request the processing to start, the photographing is started by the camera 110 of the head mounted display 100. The communication portion 250 of the information processing apparatus 200a acquires the packet containing the data associated with the first frame of the photographed image from the head mounted display 100 (S10). Since the data is transmitted in the transmission unit step by step as described above, the processing in S10 is actually executed in parallel with the subsequent processing. This also applies to a retransmission request in S16 and lacked information producing processing in S18.

The packet analyzing portion 252 stores the data associated with the photographed image in the buffer 256 in order of the acquisition of the packets, and detects the lost packet by comparing the packet ID and the transmission order with each other (S12). The retransmission request producing portion 254a, at a timing at which the packet loss is detected, starts to measure the elapsed time for the retransmission of the packet concerned. If the elapsed time is within the allowable time for the retransmission (Y in S14), then, the retransmission request producing portion 254a produces a retransmission request for the packet concerned, and transmits the retransmission request to the head mounted display 100 through the communication portion 250 (S16). With respect to the lost packet, the pieces of processing in S10, S12, and S16 are repetitively executed until the allowable time expires.

If the elapsed time exceeds the allowable time, then, the retransmission request is not made (N in S14), then, the lacked information producing portion 258 produces the lacked information exhibiting that the data corresponding to the packet concerned is lacked (S18). The decoding portion 260 and the image analyzing portion 262a execute the decoding processing and the analysis processing, respectively, with the portion in the image in which the data is lacked being distinguished from other portions while the lacked information concerned is referred (S20). Specifically, the decoding portion 260 acquires the data associated with the photographed image from the buffer 256 and decodes the data thus acquired, and substitutes invalid data for the pixel value of the portion in which the data is lacked.

The image analyzing portion 262a excludes the portion in which the data is lacked from the analysis object or the output object of the result, and produces additional information exhibiting that the portion concerned has a possibility of the low accuracy of the analysis result. It should be noted that only one of the decoding portion 260 and the image analyzing portion 262a may cope with the data lack as described above depending on the format of the lacked information or the contents of the image analysis.

In the case where the result of the image analysis proves that the accuracy exceeds the predetermined lower limit (N in S22), the processing condition adjusting portion 268 adjusts the setting in the retransmission request producing portion 254a so as to shorten the allowable time for the retransmission processing (S24). In the case where the accuracy reaches the predetermined lower limit (Y in S22), the adjustment for the allowable time is not carried out. It should be noted that in the case where the accuracy falls below the lower limit from the beginning, the adjustment may be carried out so as to lengthen the allowable time, thereby optimizing the analysis accuracy. In this case, however, from a viewpoint from the latency from the photographing to the display, the upper limit for the allowable time needs to be especially decided.

The information processing portion 264 executes the information processing by using the result of the image analysis or the like, and the output data producing portion 266 produces the result of the information processing in the form of the output data associated with the display image, the sound or the like (S26). The output data concerned is transmitted from the communication portion 250 to the head mounted display 100, and is outputted from the head mounted display 100. If there is no need for stopping the processing by the input or the like from the user, then, with respect to the subsequent frame of the photographed image, the pieces of processing from S10 to S26 are repetitively executed (N in S28). If there is caused the need for stopping the processing, then, all the pieces of processing are ended (Y in S28).

According to the embodiment which has been described so far, in the system for acquiring the data associated with the photographed image through the wireless communication, and executing the information processing, the lacked information is produced in which the data unable to be acquired is associated with the position on the image. Then, in the image analysis or the information processing, the portion in which the data is lacked is differentiated from other portions to be processed. As a result, in the various pieces of processing until the output data is produced, the processing result of the portion in which the data is lacked is treated similarly to the case of the result of other areas, and then the bad influence can be prevented from being exerted on the entire output result.

In addition, such a measure as to execute the processing so as to avoid the portion in which the data is lacked becomes possible depending on the analysis contents. Therefore, the analysis accuracy for the area in which the data is normally obtained can be maintained, and the unnecessary processing is omitted, thereby enabling the load applied to the processing to be lightened. These measures are taken for the data lack, thereby resulting in that even when a time allowable for the retransmission request responding to the packet loss during the data transmission is limited, the accuracy for the processing can be maintained as much as possible. As a result, the balance between the accuracy of the processing result, and the currency can be made satisfactory.

In addition, the allowable time, the analysis algorithm, the parameter of the coding processing, and the like are adjusted based on the unique knowledge about the relationship between the accuracy of the image analysis, and the time allowable for the retransmission request for the packet. For example, the adjustment is carried out so as to shorten the allowable time within the range in which it is guaranteed to obtain the accuracy, thereby realizing in that the influence exerted on the result can be reduced, and the speed up of the processing can be realized. In addition, the allowable time adjusted in such a manner reflects the characteristics of the photographed image that the analysis accuracy is hardly obtained. Therefore, the coding processing before the transmission is optimized based on this situation, thereby enabling the optimal transmission form responding to the photographing environment or the like to be realized. For the switching of the analysis algorithm responding to the allowable time, similarly, the processing under the condition in which the best result is obtained for the given environment including the communication environment can be executed.

The present invention has been described based on the embodiment so far. It is understood by a person skilled in the art that the embodiment is merely an exemplification, and various modified changes can be made in combinations of these constituent elements or the processing processes, and such modified changes also fall within the scope of the present invention.

REFERENCE SIGNS LIST

30 . . . Display, 40 . . . Communication control portion, 44 . . . Antenna, 100 . . . Head mounted display, 110 . . . Camera, 120 . . . Data acquiring portion, 122 . . . Coding portion, 124 . . . Buffer, 126 . . . Communication portion, 128 . . . Retransmission control portion, 130 . . . Data outputting portion, 132 . . . Processing condition adjusting portion, 200 . . . Information processing apparatus, 222 . . . CPU, 224 . . . GPU, 226 . . . Main memory, 250 . . . Communication portion, 252 . . . Packet analyzing portion, 254 . . . Retransmission request producing portion, 256 . . . Buffer, 258 . . . Lacked information producing portion, 260 . . . Decoding portion, 262 . . . Image analyzing portion, 264 ... Information processing portion, 266 ... Output data producing portion, 268 ... Processing condition adjusting portion.

INDUSTRIAL APPLICABILITY

As set forth hereinabove, the present invention can be utilized in the various kinds of information processing apparatuses such as the game machine, the image processing apparatus, and the personal computer, the information processing system including those, and the like.

The invention claimed is:

1. An information processing apparatus, comprising:
   a communication portion configured to establish a communication with an image pickup device and acquire data associated with a photographed image;
   a lacked information producing portion configured to produce lacked information in which data lacked as a result of the communication is associated with a position on the photographed image;
   an image analyzing portion configured to differentiate a portion in which the data is lacked from other portions by referring to the lacked information, thereby carrying out an analysis of the photographed image; and
   an output data producing portion configured to produce output data based on a result of the analysis and output the output data,
   wherein the lacked information producing portion includes information exhibiting a ratio at which the data is lacked in every block obtained by dividing an image into a predetermined area or by dividing image data into a predetermined data size.

2. The information processing apparatus according to claim 1, further comprising:
   a decoding portion configured to decode coded data associated with the photographed image acquired by the communication portion, and substitute invalid data as a pixel value of the portion in which the data is lacked by referring to the lacked information.

3. The information processing apparatus according to claim 1, wherein the lacked information producing portion includes an address and a data length of an area in which the data is lacked of a storage area of image data in the lacked information.

4. The information processing apparatus according to claim 1, wherein the image analyzing portion excludes the portion in which the data is lacked, or an area in which a falling rate of the data is higher than a predetermined threshold value from an analysis object based on the lacked information.

5. The information processing apparatus according to claim 1, wherein the image analyzing portion produces additional information associated with an effect that with respect to the portion in which the data is lacked, or an area in which a falling rate of the data is higher than a predetermined threshold value, analysis accuracy has a possibility of being low based on the lacked information.

6. An information processing system comprising:
   a head mounted display provided with an image pickup device; and
   an information processing apparatus configured to establish a communication with the head mounted display, produce a display image and cause the head mounted display to display the display image;
   the information processing apparatus including
   a communication portion configured to acquire data associated with a photographed image from the head mounted display,
   a lacked information producing portion configured to produce lacked information in which data lacked as a result of the communication is associated with a position on the photographed image,
   an image analyzing portion configured to differentiate a portion in which the data is lacked from other portions by referring to the lacked information, thereby carrying out an analysis of the photographed image, and
   an output data producing portion configured to produce output data based on a result of the analysis and output the output data,
   wherein the lacked information producing portion includes information exhibiting a ratio at which the data is lacked in every block obtained by dividing an image into a predetermined area or by dividing image data into a predetermined data size.

7. An information processing method by an information processing apparatus, comprising:
   establishing a communication with an image pickup device and acquiring data associated with a photographed image;
   producing lacked information in which data lacked as a result of the communication is associated with a position on the photographed image;
   differentiating a portion in which the data is lacked from other portions by referring to the lacked information, thereby carrying out an analysis of the photographed image; and
   producing output data based on a result of the analysis and outputting the output data to a display device,
   wherein the lacked information includes information exhibiting a ratio at which the data is lacked in every block obtained by dividing an image into a predetermined area or by dividing image data into a predetermined data size.

* * * * *